US012254860B2

(12) United States Patent
Hsieh et al.

(10) Patent No.: US 12,254,860 B2
(45) Date of Patent: Mar. 18, 2025

(54) DYNAMIC RANGE COMPRESSION COMBINED WITH ACTIVE NOISE CANCELLATION TO REMOVE ARTIFACTS CAUSED BY TRANSIENT NOISES

(71) Applicant: Synaptics Incorporated, San Jose, CA (US)

(72) Inventors: Pei-Wen Hsieh, New Taipei (TW); Saeed Mosayyebpour Kaskari, Irvine, CA (US); Hong Qiu, Shanghai (CN); Chuan-Yau Chan, New Taipei (TW)

(73) Assignee: Synaptics Incorporated, San Jose, CA (US)

( * ) Notice: Subject to any disclaimer, the term of this patent is extended or adjusted under 35 U.S.C. 154(b) by 384 days.

(21) Appl. No.: 18/052,374

(22) Filed: Nov. 3, 2022

(65) Prior Publication Data

US 2024/0161726 A1 May 16, 2024

(51) Int. Cl.
*G10K 11/178* (2006.01)

(52) U.S. Cl.
CPC .. *G10K 11/17825* (2018.01); *G10K 11/17853* (2018.01)

(58) Field of Classification Search
CPC ....... G10K 11/17825; G10K 11/17853; H03G 7/00; H03G 9/025
USPC ....................................... 381/106, 94.1, 71.8
See application file for complete search history.

(56) References Cited

U.S. PATENT DOCUMENTS

| | | | | |
|---|---|---|---|---|
| 12,112,737 | B1 * | 10/2024 | Pai | H04R 3/02 |
| 2020/0236466 | A1 * | 7/2020 | Zhao | H04R 1/1041 |
| 2021/0097970 | A1 * | 4/2021 | Saux | G10K 11/17854 |
| 2021/0349681 | A1 * | 11/2021 | Chen | H04R 1/1041 |
| 2022/0360897 | A1 * | 11/2022 | Lee | H04R 3/12 |
| 2023/0087943 | A1 * | 3/2023 | Li | G10K 11/17835 381/71.6 |
| 2024/0221769 | A1 * | 7/2024 | Philipsson | G10L 21/0208 |

FOREIGN PATENT DOCUMENTS

| | | | | | |
|---|---|---|---|---|---|
| CN | 112929795 | A | * | 6/2021 | |
| CN | 213485154 | U | * | 6/2021 | |
| CN | 114501211 | A | * | 5/2022 | |
| CN | 115623384 | A | * | 1/2023 | |
| CN | 115623385 | A | * | 1/2023 | |
| CN | 115802224 | A | * | 3/2023 | G10K 11/178 |

* cited by examiner

*Primary Examiner* — David L Ton
(74) *Attorney, Agent, or Firm* — Paradice & Li LLP

(57) ABSTRACT

This disclosure provides methods, devices, and systems for active noise cancellation (ANC). The present implementations more specifically relate to the use of dynamic range compression (DRC) for ANC. In some aspects, an ANC system receives an input audio signal of a transient noise as measured by a microphone, performs DRC on the input audio signal to generate a compressed dynamic range audio signal, and performs ANC on the compressed dynamic range audio signal to generate a cancellation signal associated with the input audio signal. The cancellation signal is based on an adjusted gain of the input audio signal to prevent saturation or large spikes of the cancellation signal, which can cause undesirable audio during playback.

20 Claims, 15 Drawing Sheets

DYNAMIC RANGE COMPRESSION COMBINED WITH ACTIVE NOISE CANCELLATION TO REMOVE ARTIFACTS CAUSED BY TRANSIENT NOISES

TECHNICAL FIELD

The present implementations relate generally to active noise cancellation, and specifically to the use of dynamic range compression for active noise cancellation.

BACKGROUND OF RELATED ART

Active noise cancellation (ANC) is the process of reducing an unwanted sound signal through the addition of a second sound signal specifically designed to cancel or reduce the unwanted sound. For example, various ANC headphones include a microphone to measure environmental noise (such as airplane engine sounds, road or pedestrian traffic, or other unwanted sounds). The headphones use the measured environment noise to generate a cancellation signal that is 180 degrees out of phase with the environment noise signal and play the cancellation signal to cancel or reduce the environmental noise. ANC typically works best for reducing persistent noises and can be less helpful in reducing transient noises (such as noises lasting seconds or a fraction of a second). Indeed, some transient noises, such as sharp sounds from a door slamming, car backfiring, firework exploding, or other noises of a short duration, may cause a cancellation signal to be generated by ANC that is more unpleasant during playback to a listener than the transient noise itself.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter.

One innovative aspect of the subject matter of this disclosure can be implemented in a method for performing active noise cancellation (ANC). The method includes steps of receiving an input audio signal of a transient noise as measured by a microphone, performing dynamic range compression (DRC) on the input audio signal to generate a compressed dynamic range audio signal, and performing ANC on the compressed dynamic range audio signal to generate a cancellation signal associated with the input audio signal.

Another innovative aspect of the subject matter of this disclosure can be implemented in an ANC system. The ANC system includes an input to receive an input audio signal of a transient noise as measured by a microphone, a DRC module to perform DRC on the input audio signal to generate a compressed dynamic range audio signal, and an ANC module to perform ANC on the compressed dynamic range audio signal to generate a cancellation signal associated with the input audio signal.

Another innovative aspect of the subject matter of this disclosure can be implemented in another method for performing ANC. The method includes steps of receiving an input reference audio signal of a transient noise as measured by a reference microphone, receiving an input error audio signal of feedback of audio from a loudspeaker as measured by an error microphone, sampling the input reference audio signal to generate a stream of input reference frames, and performing DRC on the stream of input reference frames. Performing DRC on the stream of input reference frames includes, for each original input reference frame from the stream of input reference frames: converting a copy of the original input reference frame from a linear domain to a logarithm domain; detecting a frame level of the input reference frame in the logarithm domain; mapping the frame level of the input reference frame to a new frame level; converting the input reference frame with the new frame level back to the linear domain; performing gain smoothing on the input reference frame with the new frame level in the linear domain; and adjusting the original input reference frame based on the corresponding gain smoothed input reference frame. Adjusting each original input reference frame from the stream of input reference frames generates a compressed dynamic range reference audio signal. The method also includes steps of: performing ANC on the compressed dynamic range reference audio signal, including applying a feed forward (FF) infinite impulse response (IIR) filter to each adjusted input reference frame to generate a stream of reference output frames of a cancellation signal; processing the error audio signal; and combining the cancellation signal and the processed error audio signal to generate a final audio signal for playback by the loudspeaker.

BRIEF DESCRIPTION OF THE DRAWINGS

The present implementations are illustrated by way of example and are not intended to be limited by the figures of the accompanying drawings.

DETAILED DESCRIPTION

Figure 1:
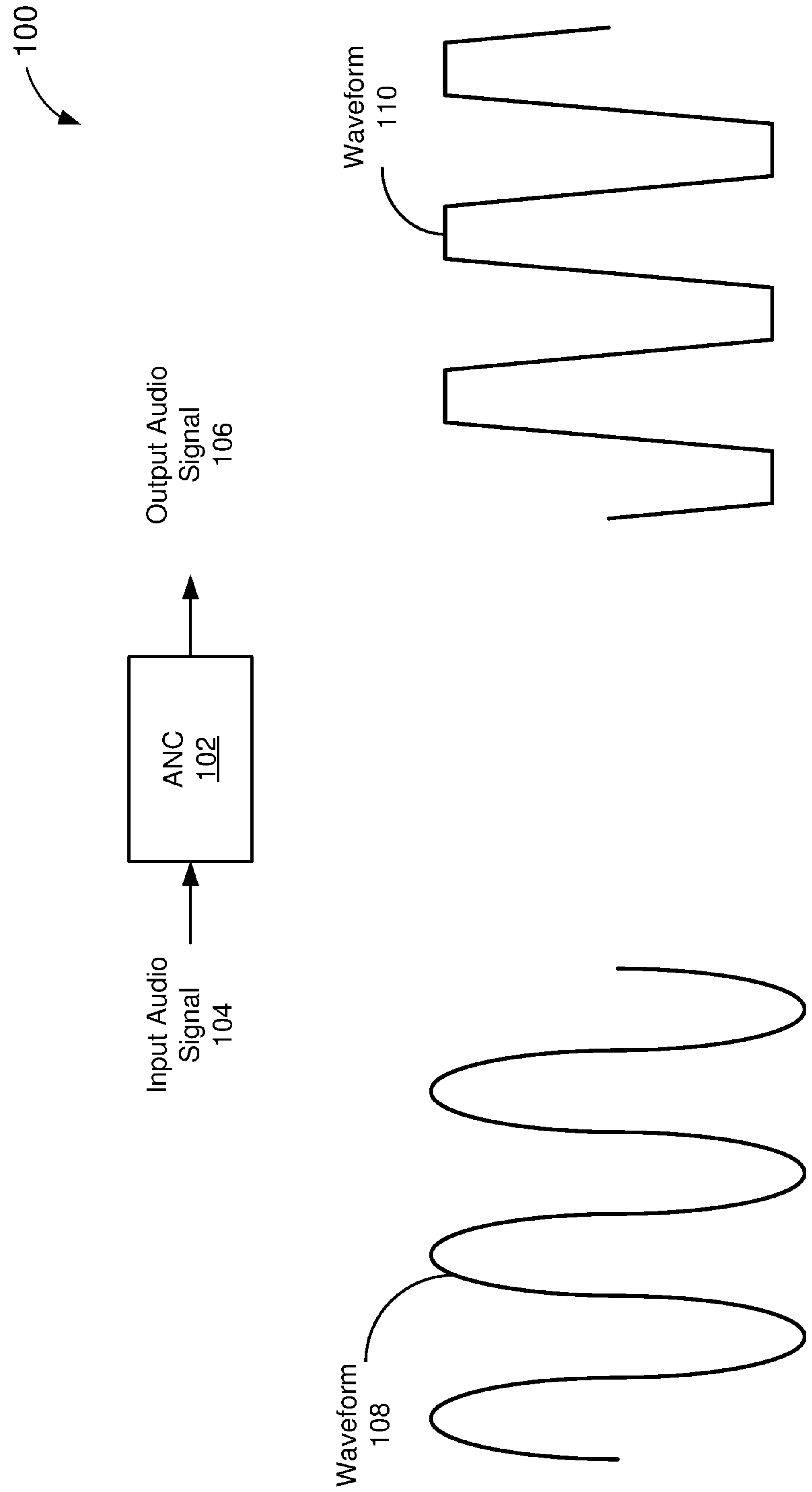
FIG. 1 (prior art)
FIG. 1 shows a prior art active noise cancellation (ANC) system.

In the following description, numerous specific details are set forth such as examples of specific components, circuits, and processes to provide a thorough understanding of the present disclosure. The term "coupled" as used herein means connected directly to or connected through one or more intervening components or circuits. The terms "electronic system" and "electronic device" may be used interchangeably to refer to any system capable of electronically processing information. Also, in the following description and for purposes of explanation, specific nomenclature is set forth to provide a thorough understanding of the aspects of the disclosure. However, it will be apparent to one skilled in the art that these specific details may not be required to practice the example embodiments. In other instances, well-known circuits and devices are shown in block diagram form to avoid obscuring the present disclosure. Some portions of the detailed descriptions which follow are presented in terms of procedures, logic blocks, processing, and other symbolic representations of operations on data bits within a computer memory.

These descriptions and representations are the means used by those skilled in the data processing arts to most effectively convey the substance of their work to others skilled in the art. In the present disclosure, a procedure, logic block, process, or the like, is conceived to be a self-consistent sequence of steps leading to a desired result. The steps are those requiring physical manipulations of physical quantities. Usually, although not necessarily, these quantities take the form of electrical or magnetic signals capable of being stored, transferred, combined, compared, and otherwise manipulated in an electronic system. It should be borne in mind, however, that all of these and similar terms are to be associated with the appropriate physical quantities and are merely convenient labels applied to these quantities.

Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving," "combining," "adjusting," "identifying," or the like, refer to the actions and processes of an electronic system, or similar electronic device, that manipulates and transforms data represented as physical (electronic) quantities within the system (such as within registers and memories or other storage) into other data similarly represented as physical quantities within the system or other such information storage, transmission, or audio devices.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described below generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example input devices may include components other than those shown, including well-known components such as a processor, memory and the like.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium including instructions that, when executed, performs one or more of the methods described above. The non-transitory processor-readable data storage medium may form part of a computer program product, which may include packaging materials.

The non-transitory processor-readable storage medium may comprise random access memory (RAM) such as synchronous dynamic random-access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits, and instructions described in connection with the embodiments disclosed herein may be executed by one or more processors (or a processing system). The term "processor," as used herein may refer to any general-purpose processor, special-purpose processor, conventional processor, controller, microcontroller, and/or state machine capable of executing scripts or instructions of one or more software programs stored in memory.

Active noise cancellation (ANC) includes the process of reducing an unwanted sound signal through the addition of a second sound signal specifically designed to cancel or reduce the unwanted sound. In particular, an ANC system may generate a cancellation signal that is 180 degrees out of phase with an environment noise signal and play the cancellation signal to cancel or reduce the environmental noise. Various audio devices include ANC, and in particular, the number of ANC headphones has increased over the years. An ANC system (such as included in a pair of ANC headphones) may be configured to perform one of three types of ANC: feed forward (FF) ANC; feedback (FB) ANC; or hybrid ANC. For an FF ANC system, a pair of ANC headphones may include a microphone placed on the outside of the earphone. In this manner, the microphone measures the noise of the environment outside of the earphone, and the ANC system is configured to generate a cancellation signal to reduce or cancel such noise during audio playback (such as when the ANC headphones are turned on and active). An FF ANC system may work better than an FB ANC system to cancel environmental noise. For an FB ANC system, a pair of ANC headphones may include a microphone placed on the inside of the earphone. In this manner, the microphone measures the noise of the environment between the loudspeaker and the ear in the earphone, and the ANC system is configured to generate a cancellation signal to reduce or cancel such noise during audio playback (such as when the ANC headphones are turned on and active). An FB ANC system may work best to cancel feedback during audio playback from the loudspeaker while still providing some cancellation of environmental noise that makes it into the earphone. For a hybrid ANC system, a pair of ANC headphones may include a microphone placed on the outside of the earphone and a microphone placed on the inside of the earphone. In this manner, the hybrid ANC system is a combination of the FF ANC system and the FB ANC system, which may provide improved environmental noise cancellation while also providing feedback cancellation.

As noted above, an ANC system is configured to generate a cancellation signal that is 180 degrees out of phase with a noise signal. The cancellation signal and the noise signal being added causes the sum of the two signals to be zero, thus cancelling the noise signal during playback. A problem with existing ANC systems is that the microphones, logic, and loudspeakers of ANC devices (such as ANC headphones) have a limited frequency and gain range in being able to cancel noise during audio playback. For example, while ANC headphones may perform well at reducing the constant hum of an airplane engine during a flight, ANC headphones struggle with cancelling transient noises outside of the frequency and volume range (such as a door slamming or baby crying). However, ANC systems still try to cancel the transient noises. As a result, the cancellation signal generated and introduced into an audio playback may sometimes be more unwelcome than a transient noise that the cancellation signal is attempting to cancel. For example, ANC for a loud, transient sound may create a sudden boost in the audio signal for the loudspeaker inside the earphones such that an annoying sound may be generated. For example, the sudden boost may cause the audio being played by the loudspeaker (such as music) to be saturated such that the audio is distorted, leading to an undesirable listening experience.

FIG. 1 shows a prior art ANC system 100. The ANC module 102 receives an input audio signal 104 (such as from a microphone measuring environmental noises or feedback noises) and generates an output audio signal 106 to compensate for the input audio signal 104. The input audio signal 104 is depicted as waveform 108. The output audio signal 106 is depicted as waveform 110. The range of the input audio signal 104 is so great that, as a result of ANC, the ANC module 102 may generate a clipped output audio signal 106 (as depicted in waveform 110), which may also include other distortions not depicted. As such, there is a need for ANC systems to be able to handle transient noises that may be loud or of high frequencies that have typically caused issues for traditional ANC systems.

Various implementations of the subject matter described in this disclosure are regarding the use of dynamic range compression (DRC) for ANC systems. DRC is a process of reducing the volume of loud sounds or increasing the volume of quiet sounds. In particular, the volume range of an input audio (such as the gain of the input audio signal 104) may be compressed such that at least the peak volumes of the audio do not cause a saturated audio output.

Particular implementations of the subject matter described in this disclosure can be implemented to realize the potential advantage of improving the audio playback of a loudspeaker (such as the audio playback of ANC headphones). By compressing the dynamic range of an audio signal associated with a transient noise, the cancellation signal generated by an ANC system to cancel the transient noise may not saturate final audio signal to be played so that the overall audio played by the loudspeaker is not distorted. As such, aspects of the present disclosure can improve the audio playback experience for audio systems including ANC.

Figure 2:
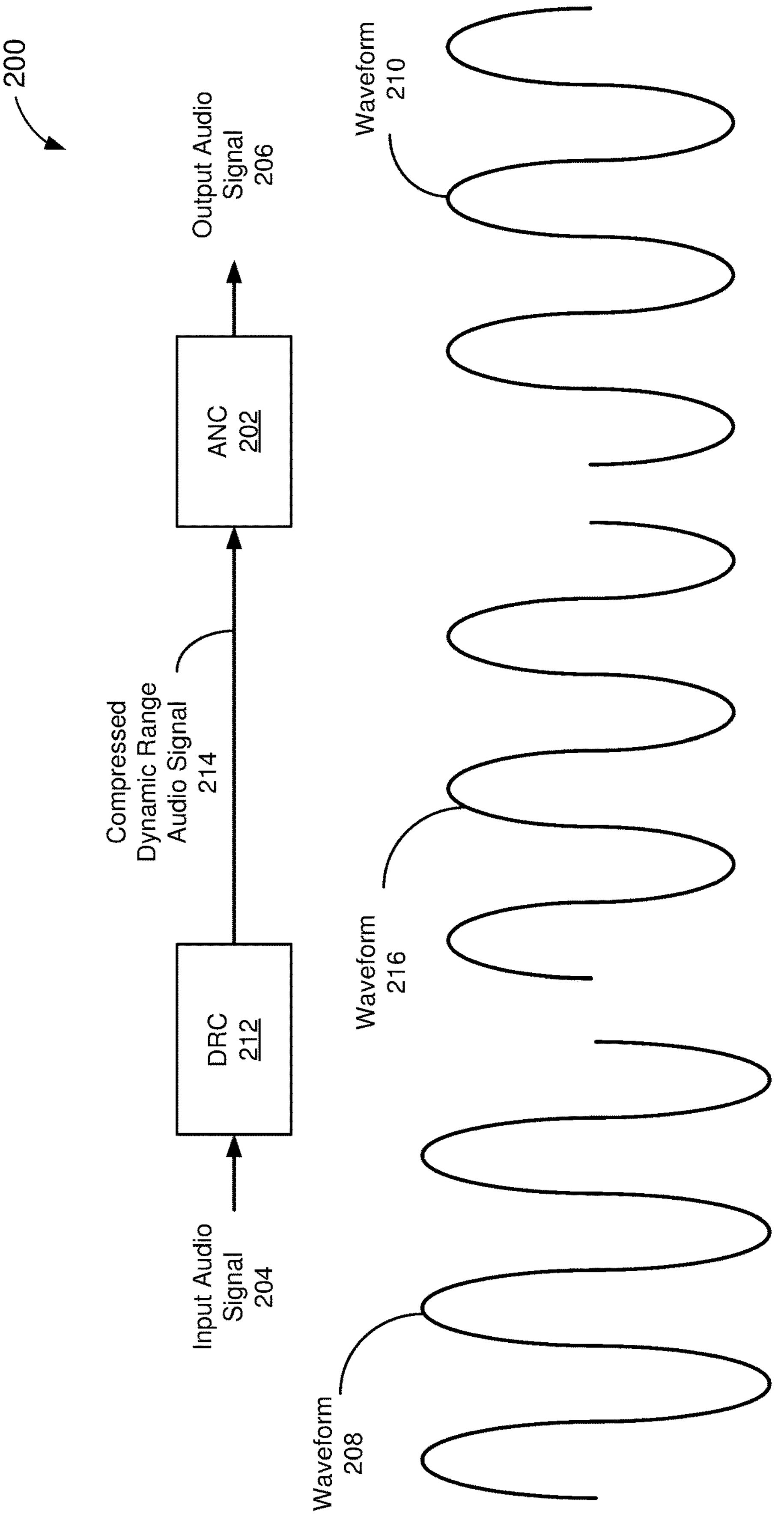
FIG. 2 shows an example ANC system including dynamic range compression (DRC), according to some implementations.

FIG. 2 shows an example ANC system 200 including DRC, according to some implementations. The ANC system 200 includes a DRC module 212 and an ANC module 202. In some implementations, the DRC module 212 and the ANC module 202 may be provided in a same microchip, circuit board, or other logic system, which may be included in the ANC system 200. The ANC system 200 may be included in any suitable device providing ANC, such as, for example, ANC headphones, ANC home theater systems, or other ANC audio devices. For example, the ANC system may be coupled to or include one or more microphones and may be coupled to or include one or more loudspeakers to be used in the cancellation of environmental noises and/or feedback during audio playback by the one or more loudspeakers.

The ANC system 200 receives an input audio signal 204. The input audio signal 204 is depicted as waveform 208. The input audio signal 204 is depicted as being the same as input audio signal 104, with waveform 208 being the same as waveform 108. If the ANC module 202 is similar to the ANC module 102, the input audio signal 204 has too great of a range to be handled by the ANC module 202.

The DRC module 212 performs DRC on the input audio signal 204 to generate a compressed dynamic range audio signal 214. The compressed dynamic range audio signal 214 is depicted as waveform 216, which has a compressed dynamic range as compared to waveform 208. The compressed dynamic range is within a range that can be processed by the ANC module 202. The ANC module 202 generates an output audio signal 206. The output audio signal 206 is depicted as waveform 210. As depicted in waveform 210, output audio signal 206 generated by the ANC module 202 based on the input compressed dynamic range audio signal 214 is not saturated or otherwise distorted.

Since the dynamic range of an audio signal associated with a transient noise is compressed for performing ANC, the ANC system attempts to only reduce the transient noise instead of attempting to completely cancel the transient noise. As a result, the cancellation signal generated to reduce the transient noise does not cause saturation or other distortions in the final audio signal to be played by the loudspeakers, and the listening experience provided by the loudspeakers of a device performing ANC with DRC may improve for transient sounds. The examples below describe various implementations of DRC for ANC.

Figure 3:
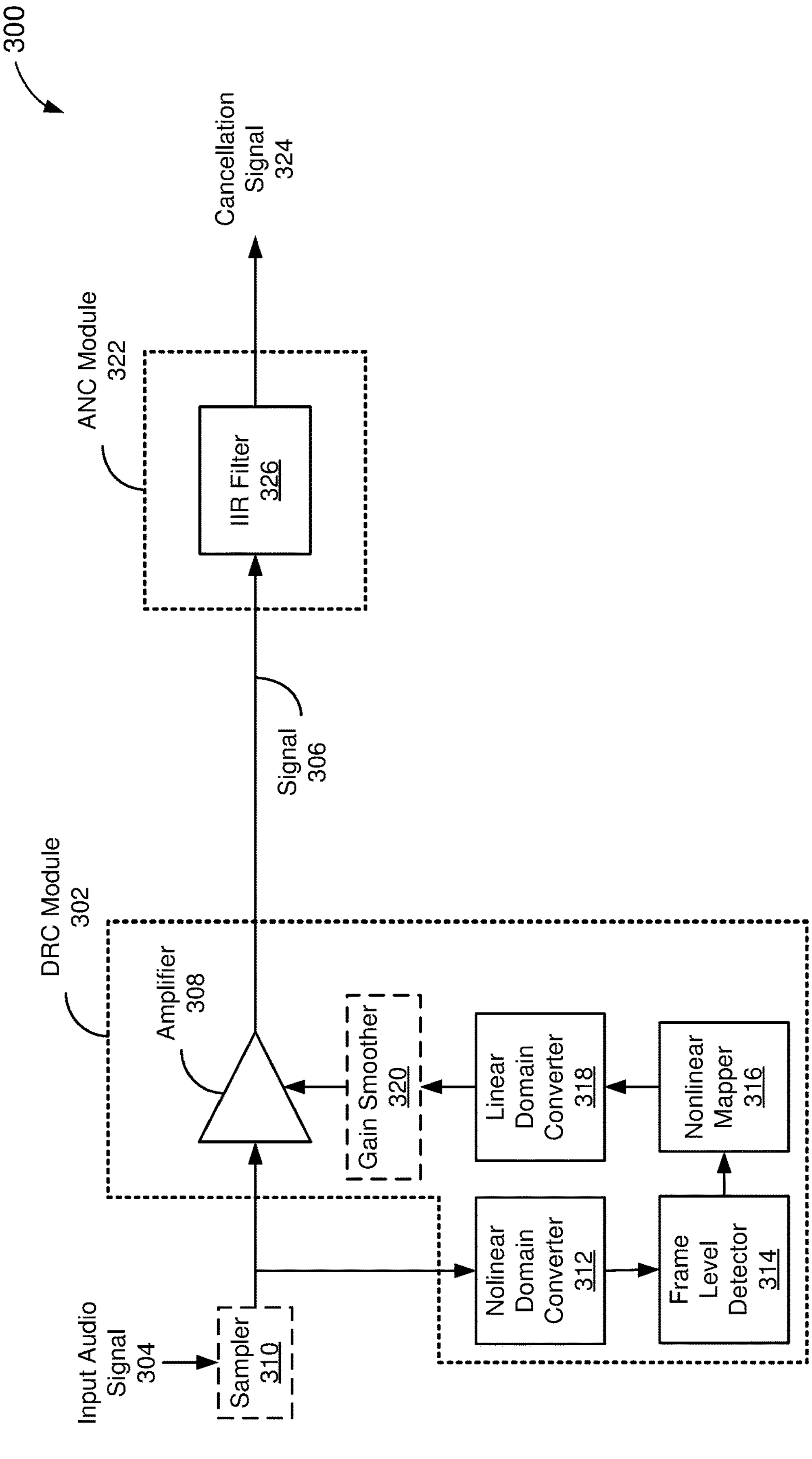
FIG. 3 shows a block diagram of an example ANC system with DRC, according to some implementations.

FIG. 3 shows a block diagram of an example ANC system 300 with DRC, according to some implementations. The ANC system 300 includes a DRC module 302 and an ANC module 322. The ANC system 300 may be an FF ANC system (with a microphone positioned on the outside of an earphone). In some implementations, the DRC module 302 and the ANC module 322 may be examples of the DRC module 212 and the ANC module 202, respectively, of FIG. 2. Thus, the DRC module 302 may be coupled to the ANC module 322 in order to provide a signal 306 that has a compressed dynamic range as compared to input audio signal 304.

In the depicted example ANC system 300, the DRC module 302 is referred to as a single chain DRC module based on the DRC module 302 processing only an input signal in order to generate the compressed dynamic range signal to be input to the ANC module 322. As depicted in other examples below, a dual chain DRC module refers to a DRC module that processes both the input signal and an output signal of the ANC module to generate the compressed dynamic range signal to be input to the ANC module. In some implementations, a single chain DRC module is used for FF ANC systems, and a dual chain DRC module is used for FB ANC systems. For a hybrid ANC system that is a combination of FF ANC and FB ANC systems, the hybrid ANC system may include a single chain DRC module for the FF ANC aspect and a dual chain DRC module for the FB ANC aspect of the hybrid ANC system.

The DRC module 302 is configured to perform DRC on the input audio signal 304, which includes compressing the dynamic range of the input audio signal 304. The input audio signal 304 may be an output of a microphone configured to measure environmental noise for an ANC system (such as an FF ANC system). If the input audio signal 304 is an analog signal or otherwise is a continuous signal, the ANC system 300 may include a sampler 310 to sample the input audio signal 304. In sampling the input audio signal 304, the sampler 310 measures the gain of the signal at that point in time. In some implementations, the sampler 310 generates a stream of input frames. As used herein, a frame includes a group of one or more samples of a signal, with a frame size referring to the number of samples in the frame. As such, performing DRC on the input audio signal includes performing DRC on the stream of input frames, which may include performing DRC on the samples of the stream of input frames. In some implementations, if the input audio signal 304 is an analog signal, the sampler 310 may include an analog to digital converter (ADC) to generate samples at a defined rate. For example, the DRC module 302 may include an amplifier 308 configured to process samples at a frequency of 192 kilohertz (kHz), and the sampler 310 may include an ADC having a sampling rate of 192 kHz to sample the input audio signal 304. To note, the sampling rate may be any suitable rate to match the processing frequency of the amplifier 308 and the ANC module 322. For example, the sampling rate, as well as the processing rate of the amplifier 308 and the ANC module 322, may be configured for a rate of 10-20 times the highest frequency reproducible by a coupled loudspeaker or that can be measured by a coupled microphone in order to approach lossless reproduction of an analog signal for playback across the entire reproducible frequency range for the microphone and loudspeaker pair.

In some implementations, in addition to the amplifier 308, the DRC module 302 includes a nonlinear domain converter 312, a frame level detector 314, a nonlinear mapper 316, and a linear domain converter 318. The DRC module components 312-318 are configured to generate a control signal for the amplifier 308 to control the amount of adjustment performed by the amplifier on the input audio signal 304. For example, the DRC module components 312-318 may be configured to generate one of a stream of control frames from which the amplifier 308 bases adjusting the gain of a corresponding input frame of the input audio signal 304. In some implementations, the DRC module 302 may also include a gain smoother 320 for generating the control signal (such as the stream of control frames) used by the amplifier 308.

The input audio signal 304 (such as the stream of input frames from the sampler 310) may be in a linear domain, with the gain of each sample indicated by a linear measurement. In performing DRC on the stream of input frames, the nonlinear domain converter 312 of the DRC module 302 is configured to convert a copy of each original input frame from the stream of input frames from a linear domain to a logarithm domain. For example, the nonlinear domain converter 312 may convert the gain measurement of one or more samples of each frame (such as each sample or a subset of the samples) in the linear domain to the logarithm domain. In some implementations, the logarithm transform applied to the stream of input frames is a base 10 logarithm applied to each sample. However, any suitable logarithm transform may be used, such as a natural logarithm (In) or another suitable base number logarithm. In addition, while a logarithm transform is described as being used, other suitable nonlinear transforms may be used to convert from the linear domain to another suitable nonlinear domain. To note, the original input frames (including the one or more samples per input frame) are input to the amplifier 308.

The frame level detector 314 of the DRC module 302 is configured to detect a frame level of each input frame in the logarithm domain. For example, the frame level detector 314 indicates a gain measurement of each frame as output by the nonlinear domain converter 312. For each frame in the logarithm domain, a gain measurement of the frame is provided to the nonlinear mapper 316.

In some implementations, the frame level detector 314 (and the other components 314-318 of the DRC module) may operate at the same rate as the amplifier 308. As such, the frame size may be one such that each frame includes only one sample, and the DRC module components generate a control signal to the amplifier 308 for each sample to be adjusted by the amplifier. In some implementations, the frame level of a frame may be a magnitude of the gain of the sample in the frame.

Since the amplifier 308 may operate at a frequency in the hundreds of kHz range, the cost, size, and power requirements of the DRC module components to operate at the same rate as the amplifier 308 may be considerable. Components that operate at a lower rate (e.g., at 6 kHz as compared to 192 kHz) may thus reduce the cost, size, and power requirements for performing DRC. As such, in some other implementations, the DRC module components 314-318 may operate at a lower rate than the amplifier 308. In this manner, a frame may include more than one sample. The frame size may be based on the difference between the processing rate of the components 314-318 and the processing rate of the amplifier 308 and ANC module 322. For example, if the ANC module 322 processes 192 thousand samples per second, and components 314-318 process six thousand frames per second (with frame level detector 314 providing six thousand measurements per second), the frame size may be 32 samples (192/6).

The frame level detector 314 detects and outputs a frame level for each frame. If a frame includes a plurality of samples, the frame level detector 314 detects a frame level across the plurality of samples. For example, $x_0[n]$ denotes an input sample to the ANC module 322 (such as the IIR filter 326) at time n. For a frame size of $N_F$, the kth frame of $x_0[n]$ ($x_0[k]$) includes $N_F$ number of samples: $x_0[N_F*k]$; $x_0[N_F*k-1]$; $x_0[N_F*k-2]$; . . . ; and $x_0[N_F*k-N_F+1]$.

In some implementations of detecting a frame level of an input frame, the frame level detector 314 identifies as the frame level the maximum sample magnitude across the plurality of samples of a frame. For example, for the kth frame of $x_0[n]$ ($x_0[k]$) in the above example, the frame level $x_{L,0}[k]$ may be measured as depicted in equation (1) below:

$$x_{L,0}[k]=\max|x_0[N_F*k-m]| \text{ for } m=0,1, \ldots ,N_F-1 \quad (1)$$

In this manner, the highest magnitude of the values from the samples $x_0[N_F*k]$; $x_0[N_F*k-1]$; $x_0[N_F*k-2]$; . . . ; and $x_0[N_F*k-N_F+1]$ in the frame is the frame level of the frame. While an implementation for detecting the frame level is provided, other implementations may be used. For example, the first sample's magnitude may be set as the frame level, or the frame level may be an average of the magnitudes across the samples.

The frame level detector 314 provides each frame level to the nonlinear mapper 316. The nonlinear mapper 316 is configured to map the frame level of each input frame to a new frame level. The nonlinear mapper 316 may map the frame level to a new frame level based on a compression function. For example, the compression function may be denoted as $f(x_L[k], \text{thrd}, \text{slope})$. As noted above, $x_L[k]$ is the frame level of the kth frame. Thrd is a parameter that defines a threshold above which compression is to occur. In this manner, the frame level may not be adjusted for frames including samples with gains less than the threshold. In a simplified example, if thrd is 2, any frames with a frame level less than 2 have a new frame level that is the same (with the nonlinear mapper 316 not changing the frame level for the frame). If a frame has a frame level greater than 2, the nonlinear mapper 316 may compress the frame level towards 2, and the new frame level for the frame is the compressed frame level. Slope is a parameter that defines the amount of compression to be performed. The thrd and slope may be any suitable values as set by a manufacturer, a vendor, or in another suitable manner.

In some implementations, the nonlinear mapper 316 is configured to generate new frame levels based on the compression function defined in equation (2) below:

$$f(x_L[k], thrd, \text{slope}) = 10^{\frac{y_{dB}[k]-x_{dB}[k]}{20}} \quad (2)$$

$x_{dB}[k]$ is defined in equation (3) below:

$$x_{dB}[k]=20\log_{10}(x_L[k]) \quad (3)$$

$y_{dB}[k]$ is defined in equation (4) below:

$$y_{dB}[k] = \begin{cases} thrd + \text{slope}\ (x_{dB}[k] - thrd) & \text{for } x_{dB}[k] > thrd \\ x_{dB}[k] & \text{otherwise} \end{cases} \quad (4)$$

For the above example compression function, the nonlinear mapper 316, which processes input frames before the ANC module 322, generates a new frame level for an input frame $x_{L,0}[k]$ as a compression gain $g_0[k]$ as depicted in equation (5) below:

$$g_0[k]=f(x_{L,0}[k],\text{thrd}_0,\text{slope}_0) \quad (5)$$

$\text{Thrd}_0$ is the threshold associated with the input frame, and $\text{slope}_0$ is the slope parameter associated with the input frame.

While an example compression function is given for performing nonlinear mapping, any suitable compression or mapping may be performed to compress the values. For example, compression may be based on a decay curve or an exponential curve such that compression for larger values is greater than compression for smaller values.

The linear domain converter 318 is configured to convert the input frame with the new frame level back to the linear domain. For example, each compression gain generated by the nonlinear mapper 316 (such as based on the compression function in equation (5) above) is in the logarithm domain based on a conversion by the nonlinear domain converter 312. For each frame, the nonlinear domain converter 318 may convert the frame's compressed gain in the logarithm domain to the linear domain, which may be an inverse of the conversion performed by the nonlinear domain converter 312.

In some implementations, the input frame's compressed gain in the linear domain may be a control input to the amplifier 308, and the amplifier 308 may adjust the corresponding input frame's gain based on the compressed gain. For example, the amplifier 308 may compress each sample of the input frame based on the compressed gain input to the amplifier 308. If the DRC module 302 does not include a gain smoother 320, adjustment of the samples in the frame may be based exclusively on the compressed gain for that frame. In this manner, the same compressed gain is used as a control input for each sample of the input frame to the amplifier 308.

In some other implementations, the DRC module 302 may include a gain smoother 320. In this manner, before the gains are provided as a control input to the amplifier 308, the gains are provided to the gain smoother 320. The gain smoother 320 is configured to perform gain smoothing on each input frame with a new frame level. The gain smoother 320 may operate at the same frequency as the amplifier 308 (such as at 192 kHz). As such, in performing gain smoothing on an input frame with a new frame level, the gain smoother 320 may generate a gain for each sample of the input frame to be used as a control input to the amplifier 308 for that sample to be adjusted. The gain smoother 320 may generate a gradual change in the gain across samples based on changes in the compressed gain between frames. In some implementations, the gain smoother 320 generates a smoothed sample-by-sample gain $g_{smooth}[n]$ at time n by performing branching exponential smoothing on frame-by-frame gain $g_{total}[k]$, such as depicted in equation (6) below:

$$g_{smooth}[n] = \begin{cases} a_{release}g_{smooth}[n-1] + (1-a_{release})g_0\left[\left\lfloor \frac{n}{N_F} \right\rfloor\right], & \text{for } g_{smooth}[n] > g_0\left[\left\lfloor \frac{n}{N_F} \right\rfloor\right] \\ a_{attack}g_{smooth}[n-1] + (1-a_{attack})g_0\left[\left\lfloor \frac{n}{N_F} \right\rfloor\right] & \text{otherwise.} \end{cases} \quad (6)$$

$$\left\lfloor \frac{n}{N_F} \right\rfloor$$

is a floor operation of time n divided by frame size $N_F$, which may indicate which frame k includes the sample associated with time n. For gain smoother 320, $$g_0\left[\left\lfloor \frac{n}{N_F} \right\rfloor\right]$$

is $g_0[k]$ in the linear domain from the linear domain converter 318. $a_{release}$ and $a_{attack}$ are different smoothing factors. $a_{release}$ may be a smaller smoothing factor to cause less smoothing between samples than $a_{attack}$, which may be a larger smoothing factor. While an example implementation of gain smoothing is provided above, any suitable gain smoothing may be performed, such as a linear variation in gain across the samples of a frame based on the change in compressed gains between the frame and a previous frame.

Referring to the amplifier 308, the amplifier 308 adjusts the original input frame based on the converted input frame in the linear domain. For example, the amplifier 308 adjusts a gain of each sample in an original input frame based on a compressed gain received as a control input (such as $g_0[k]$ from the linear domain converter 318 for the frame including the corresponding sample or $g_{smooth}[n]$ from the gain smoother 320 for the corresponding sample). In some implementations, the amplifier 308 is configured to compress the dynamic range of the input audio signal 304 as depicted in equation (7) below:

$$y[n]=g_{smooth}[n]*x[n] \quad (7)$$

x[n] is the input sample to the amplifier 308, $g_{smooth}[n]$ is the control input as provided by the gain smoother 320, and y[n] is the processed sample as output by the amplifier 308 and provided to the ANC module 322. As depicted in equation (7) above, the amplifier multiplies the input sample by $g_{smooth}[n]$ to generate the output sample. The stream of output samples together may be referred to as a compressed dynamic range audio signal. The generated output samples of each frame of the compressed dynamic range audio signal are provided to the ANC module 322.

The ANC module 322 is configured to perform ANC on the compressed dynamic range audio signal. In some implementations, performing ANC on the compressed dynamic range audio signal includes applying an IIR filter 326 to a stream of adjusted input frames from the amplifier 308 to generate a stream of output frames associated with a cancellation signal 324. The cancellation signal 324 is the signal to be included in audio playback to reduce the transient noise associated with the input audio signal 304.

In applying the IIR filter 326 to the stream of adjusted input frames from the amplifier 308, each of the samples in the stream may be provided to an IIR filter 326 to generate an output that is the cancellation signal 324. The IIR filter 326 may include any suitable IIR filter. For example, the IIR filter may be configured based on any suitable filter coefficients for the IIR filter, which may be based on available memory, desired output length of the IIR filter, or other factors in designing the IIR filter. If the ANC system is an FF ANC system, the IIR filter may be an FF IIR filter. If the ANC system is an FB ANC system, the IIR filter may be an FB IIR filter. For a hybrid ANC system, the IIR filter may be FF or FB based on the portion of the hybrid ANC system corresponding to the IIR filter. In FIG. 3, if the ANC system 300 is an FF ANC system, the IIR filter 326 may be an FF IIR filter. While the ANC module 322 is depicted as including no other components than the IIR filter 326 for clarity in explaining aspects of the present disclosure, the ANC module 322 may include one or more components not depicted in FIG. 3 or in the other Figures. For example, the ANC module 322 may include one or more additional filters or other components to process and generate the cancellation signal 324 for playback by a loudspeaker.

As noted above, the ANC system 300 may be an FF ANC system configured for a microphone positioned on the outside of an earphone to measure environmental noise. FF ANC systems may be more stable and have less chance in generating distortion in audio playback as compared to FB ANC systems (for which a microphone is positioning inside the earphone to measure audio feedback and some environmental noise. As such, a single chain DRC module may be sufficient for performing DRC on the input audio signal to an FF ANC system. In some implementations, an FB ANC system may include additional components for DRC to compensate for the increased instability. For example, an FB ANC system may include a dual chain DRC module, as described in the examples below.

Figure 4:
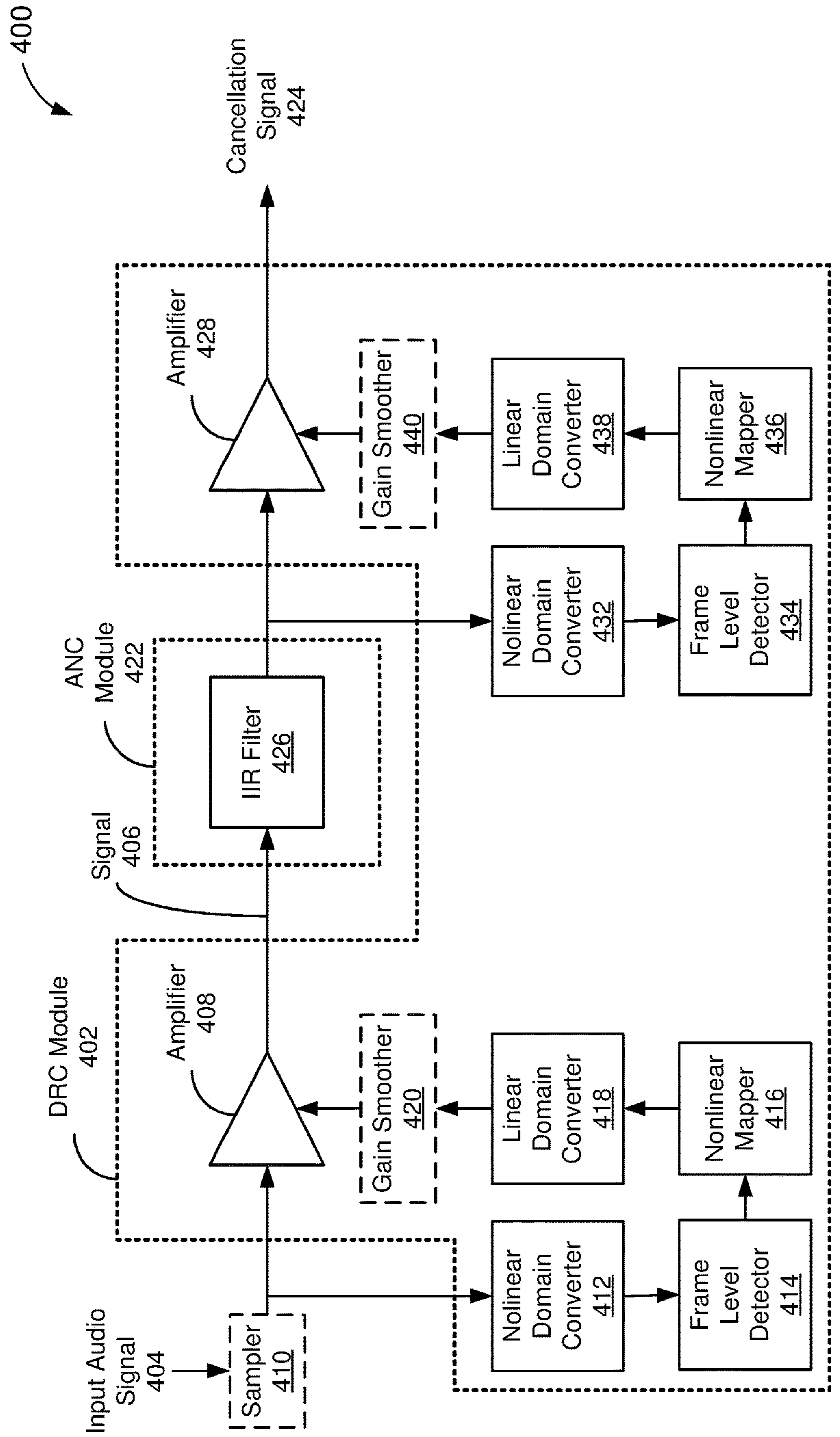
FIG. 4 shows a block diagram of another example ANC system with DRC, according to some implementations.

FIG. 4 shows a block diagram of another example ANC system 400 with DRC, according to some implementations. The ANC system 400 includes a DRC module 402 and an ANC module 422. The ANC system 400 may be an FB ANC system (with a microphone positioned inside an earphone). In some implementations, the DRC module 402 and the ANC module 422 may be examples of the DRC module 212 and the ANC module 202, respectively, of FIG. 2. Thus, the DRC module 402 may be coupled to the ANC module 422 in order to provide a signal 406 that has a compressed dynamic range as compared to input audio signal 404.

In the depicted example ANC system 400, the DRC module 402 is a dual chain DRC module. A first chain of DRC module components 412-418 (and, optionally, 420) may be similar to the single chain of DRC module components 312-318 (and, optionally, 320) of FIG. 3. As such, the first chain of DRC module components 412-418 (and, optionally, 420) process input frames to the ANC module 422. A second chain of DRC module components 432-438 (and, optionally, 440) process the output of the ANC module 422. In this manner, the DRC module 402 may compress the input to the ANC module 422 and may also compress the output from the ANC module 422 in order to generate the cancellation signal 424.

In comparing FIG. 3 (which includes a single chain DRC module) and FIG. 4 (which includes a dual chain DRC module), the input audio signal 404 may be the same as the input audio signal 304, and the sampler 410 may be the same as the sampler 310. The DRC module components of the first chain in the DRC module 402 may be the same as the DRC module components in the DRC module 302. For example, the nonlinear domain converter 412 may be the same as the nonlinear domain converter 312, the frame level detector 414 may be the same as the frame level detector 314, the nonlinear mapper 416 may be the same as the nonlinear mapper 316, and the linear domain converter 418 may be the same as the linear domain converter 318. In addition, the amplifier 408 may be the same as the amplifier 308. If the DRC module 402 includes gain smoother 420, gain smoother 420 may be the same as gain smoother 320. As such, the DRC module components in the first chain may perform the operations as described above with reference to FIG. 3. Referring to the ANC module 422, if the ANC system 400 is an FB ANC system, the IIR filter 426 may be an FB IIR filter. The IIR filter 426 may be configured in any suitable manner, such as being based on any suitable filter coefficients for the IIR filter, which may be based on available memory, desired output length of the IIR filter, or other factors in designing the IIR filter. While the ANC module 422 is depicted as only including the IIR filter 426, the ANC module 422 may include any other suitable filters or components not depicted in FIG. 4 to assist in generating the cancellation signal 424.

The IIR filter 426 of the ANC module 422 is configured to generate a stream of output frames associated with the cancellation signal 424. For example, the IIR filter 426 generates a stream of samples based on the samples of the signal 406 input to the IIR filter 426. As depicted in FIG. 4, the second chain of the DRC module 402 performs DRC on the output of the ANC module 422. For example, a second amplifier 428 of the DRC module 402 is configured to adjust each original output frame from the ANC module 422 (such as from the IIR filter 426). An output frame from the ANC module 422 includes one or more samples output by the ANC module 422 (such as by the IIR filter 426). For example, as noted above, if the processing rate of the ANC module 422 is 192 kHz, and the processing rate of the DRC module components 434-438 is 6 kHz, a frame may include 32 samples. Adjusting an output frame from the ANC module may thus include adjusting each sample in the output frame.

The output of the ANC module 422 is samples in the linear domain, which may be organized into frames. The nonlinear domain converter 432 is configured to convert a copy of each original output frame from the linear domain to the logarithm domain. For example, the nonlinear domain converter 432 converts a copy of each sample of an original output frame from the linear domain to the logarithm domain. In some implementations, the nonlinear domain converter 432 is similar to the nonlinear domain converter 412. For example, both converters 432 and 412 may convert samples based on a base 10 logarithm function. In some other implementations, the nonlinear domain converter 432 may use a different function for converting the samples output by the ANC module 422.

To note, the frame size of the output frames from the ANC module 422 may be the same or may differ from the frame size of the input frames to the ANC module 422. For example, the frame size of the input frames is based on the processing rate of the components 414-418 as compared to the processing rate of the ANC module 422. The frame size of the output frames is based on the processing rate of the components 434-438 as compared to the processing rate of the ANC module 422. If the processing rate of the components 414-418 is the same as the processing rate of the components 434-438, the frame size is the same between input frames and output frames. For example, if the processing rate of the components is 6 kHz, and the processing rate of the ANC module 422 is 192 kHz, the frame size is 32 samples for all frames. If the processing rate of the components 414-418 differs from the processing rate of the components 434-438, the frame size differs between input frames and output frames. For example, if the processing rate of components 414-418 is 6 kHz and the processing rate of components 434-438 is 12 kHz, the frame size of input frames is 32 samples, and the frame size of output frames is 16 samples. For the sake of clarity in describing aspects of the present disclosure, the examples assume the frame size to be the same between input frames and output frames.

Referring back to the second chain of the DRC module 402, the second frame level detector 434 is configured to detect a frame level of each output frame in the logarithm domain. In some implementations, the second frame level detector 434 may be similar to the frame level detector 414. For example, the second frame level detector 434 detects and outputs a frame level for each output frame. If a frame includes a plurality of samples, the frame level detector 434 detects a frame level across the plurality of samples.

For example, referring back to the example of $x_0[n]$ denoting an input sample to an ANC module (such as to the IIR filter 426), $x_1[n]$ denotes an output sample of the ANC module (such as from the IIR filter 426) at time n. For a frame size of $N_F$, the kth frame of $x_1[n]$ ($x_1[k]$) includes $N_F$ number of samples: $x_1[N_F*k]$; $x_1[N_F*k-1]$; $x_1[N_F*k-2]$; . . . ; and $x_1[N_F*k-N_F+1]$.

In some implementations of detecting a frame level of an output frame, the second frame level detector 434 identifies as the frame level the maximum sample magnitude across the plurality of samples of a frame. For example, for the kth frame of $x_1[n]$ ($x_1[k]$) in the above example, the frame level $x_0[k]$ of $x_1[k]$ may be measured as depicted in equation (8) below:

$$x_{L,1}[k]=\max|x_1[N_F*k-m]| \text{ for } m=0,1, \ldots, N_F-1 \tag{8}$$

In this manner, the highest magnitude of the values from the samples $x_1[N_F*k]$; $x_1[N_F*k-1]$; $x_1[N_F*k-2]$; . . . ; and $x_1[N_F*k-N_F+1]$ in the frame is the frame level of the frame. In comparing equations (1) and (8), the operations of the second frame level detector 434 may be similar to the operations of the frame level detector 414. While an implementation for detecting the frame level is provided, other implementations may be used. For example, the first sample's magnitude may be set as the frame level, or the frame level may be an average of the magnitudes across the samples.

The second frame level detector 434 provides each frame level to the second nonlinear mapper 436. The second nonlinear mapper 436 is configured to map the frame level to a new frame level. In some implementations, the second nonlinear mapper 436 is similar to the nonlinear mapper 416. For example, the nonlinear mapper 416 may generate a new frame level for an input frame $x_{L,0}[k]$ as a compression gain $g_0[k]$ based on the mapping function depicted in equation (5) above. As depicted in equation (5) above, the compression gain $g_0[k]$ is based on a threshold $thrd_0$ and a slope parameter $slope_0$.

Similarly, the second nonlinear mapper 436 may generate a new frame level for a corresponding output frame $x_0[k]$ as a compression gain $g_1[k]$ based on a threshold $thrd_1$ and a slope parameter $slope_1$, such as depicted in equation (9) below:

$$g_1[k]=f(x_{L,1}[k],thrd_1,slope_1) \tag{9}$$

$Thrd_1$ is the threshold associated with the output frame, and $slope_1$ is the slope parameter associated with the output frame. The function $f(x_{L,1}[k], thrd_1, slope_1)$ may be based on equations (2)-(4) above. In some implementations, the threshold $thrd_1$ and the slope parameter $slope_1$ may be the same as the threshold $thrd_0$ and the slope parameter $slope_0$, respectively. In some other implementations, the threshold $thrd_1$ and the slope parameter $slope_1$ may differ from the threshold $thrd_0$ and the slope parameter $slope_0$, respectively. In this manner, the parameters may be the same or may differ between the nonlinear mapper 416 and the second nonlinear mapper 436 such that the nonlinear mapper 416 and the second nonlinear mapper 436 may be the same or may differ. Any suitable parameter values for the threshold $thrd_1$ and the slope parameter slopes may be used, which may be defined by a manufacturer or in another suitable manner. In some other implementations, the second nonlinear mapper 436 may use a different suitable compression function than as used for the nonlinear mapper 416 to map the frame levels of the output frames to new frame levels.

The second linear domain converter 438 is configured to convert the output frame with the new frame level back to the linear domain. For example, each compression gain generated by the second nonlinear mapper 436 (such as based on the compression function in equation (9) above) is in the logarithm domain based on a conversion by the second nonlinear domain converter 432. For each frame, the second nonlinear domain converter 438 may convert the frame's compressed gain in the logarithm domain to the linear domain, which may be an inverse of the conversion performed by the second nonlinear domain converter 432.

If the ANC system 400 does not include gain smoother 440, similar to as described above with reference an input frame's compressed gain in the linear domain as output by the linear domain converter 318 of FIG. 3, the input frame's compressed gain in the linear domain may be a control input to the amplifier 428, and the amplifier 428 may adjust the corresponding output frame's gain based on the compressed gain. In some other implementations, the DRC module 402 may include a gain smoother 440. The gain smoothers 420 and 440 may operate at the same frequency (e.g., 192 kHz), which is the same frequency as the ANC module 422 and the amplifiers 408 and 428. In some implementations, the gain smoother 440 may be similar to the gain smoother 420. For example, the gain smoother 420 may generate a smoothed gain for each sample based on the equation depicted in equation (6) above, with gain $g_{smooth,0}[n]$ for samples of input frames being based on the smoothing factors $a_{release,0}$ and $a_{attack,0}$ for samples of input frames. The second gain smoother 440 may generate a smoothed gain $g_{smooth,1}[n]$ for each sample of an output frame based on the equation depicted in equation (10) below:

$$g_{smooth}[n] = \begin{cases} a_{release,1} g_{smooth,1}[n-1] + (1 - a_{release,1}) g_1\left[\left\lfloor \frac{n}{N_F} \right\rfloor\right], & \text{for } g_{smooth,1}[n] > g_1\left[\left\lfloor \frac{n}{N_F} \right\rfloor\right] \\ a_{attack,1} g_{smooth,1}[n-1] + (1 - a_{attack,1}) g_1\left[\left\lfloor \frac{n}{N_F} \right\rfloor\right] & \text{otherwise.} \end{cases} \quad (10)$$

For gain smoother 440, $$g_1\left[\left\lfloor \frac{n}{N_F} \right\rfloor\right]$$

is $g_1[k]$ in the linear domain from the second linear domain converter 438. As noted above, the frame size $N_F$ for the second chain of the DRC module 402 may be the same or may differ from the frame size for the first chain of the DRC module 402 (with any difference being based on any difference in operating frequencies between the first chain and the second chain of the DRC module 402). As such, $N_F$ in the equations used for the first chain of the DRC module 402 may be the same or may differ from $N_F$ in the equations used for the second chain of the DRC module 402. Smoothing factors $a_{release,1}$ and $a_{attack,1}$ for samples of output frames may be the same or may differ from smoothing factors $a_{release,0}$ and $a_{attack,0}$ for samples of input frames. As such, the values of the smoothing factors may be determined in any suitable manner.

Referring to the second amplifier 428, the second amplifier 428 adjusts the original output frame based on the converted output frame in the linear domain. The second amplifier 428 may be similar to the amplifier 408. For example, if the amplifier 408 adjusts the samples of original input frames of the input audio signal 404 based on equation (7) depicted above, the second amplifier 428 may adjust the samples of original output frames of the output signal from the ANC module 422 (e.g., from the IIR filter 426) based on a similar equation, such as equation (11) depicted below:

$$y_1[n] = g_{smooth,1}[n] * x_1[n] \quad (11)$$

$x_1[n]$ is the input sample to the second amplifier 428, $g_{smooth,1}[n]$ is the control input as provided by the gain smoother 440, and $y_1[n]$ is the processed sample as output by the second amplifier 428. The stream of output samples from the second amplifier 428 together may be referred to as the cancellation signal 424. As noted above, the cancellation signal 424 may be provided to a loudspeaker for playback to reduce a transient noise measured by a microphone used to generate the input audio signal 404.

While the dual chain DRC module 402 may reduce the possibility of saturation and distorted audio playback as compared to a signal chain DRC module for FB ANC systems, the dual chain DRC module 402 includes multiple amplifiers and may include multiple gain smoothers, which operate at the same high frequency as the ANC module 422. As such, significantly additional power and device area may be needed to implement the dual chain DRC module 402 as compared to a single DRC module for an ANC system. In some other implementations of a dual chain DRC module, the control outputs of a first chain and a second chain of a DRC module may be combined and provided to a single amplifier and, optionally, a single gain smoother. In this manner, a dual chain DRC module may be configured to include only one of each component that operates at the same frequency as the ANC module 422.

Figure 5:
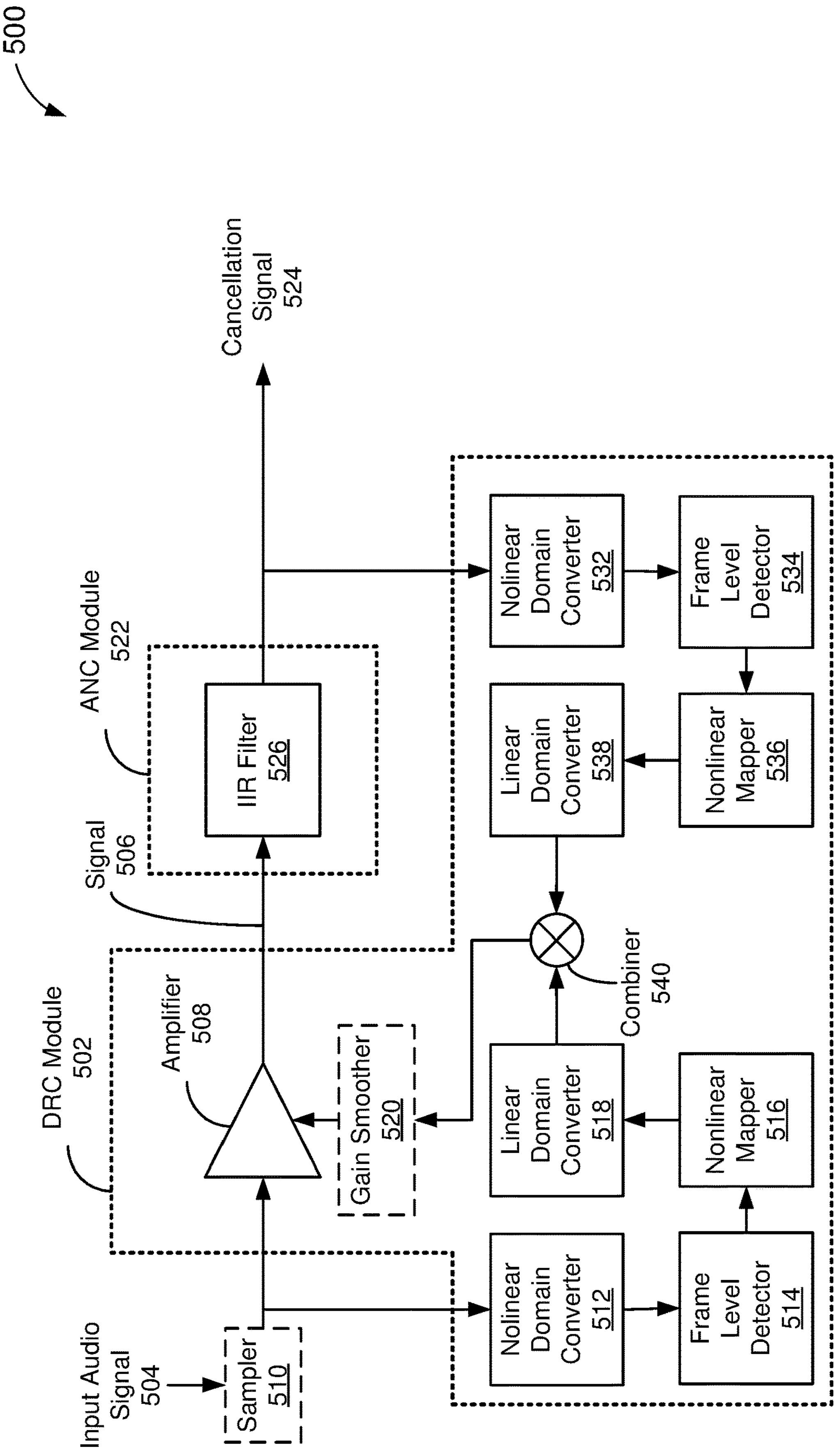
FIG. 5 shows a block diagram of another example ANC system with DRC, according to some implementations.

FIG. 5 shows a block diagram of another example ANC system 500 with DRC, according to some implementations. The ANC system 500 includes a DRC module 502 and an ANC module 522. The ANC system 500 may be an FB ANC system (with a microphone positioned inside an earphone). In some implementations, the DRC module 502 and the ANC module 522 may be examples of the DRC module 212 and the ANC module 202, respectively, of FIG. 2. Thus, the DRC module 502 may be coupled to the ANC module 522 in order to provide a signal 506 that has a compressed dynamic range as compared to input audio signal 504.

In the depicted example ANC system 500, the DRC module 502 is a dual chain DRC module with the outputs of the two chains combined before being provided to a single amplifier 508 or, optionally, a single gain smoother 520. In comparing the ANC system 400 of FIG. 4 and the ANC system 500 of FIG. 5, the input audio signals 404 and 504 may be the same, the samplers 410 and 510 may be the same, and the ANC modules 422 and 522 may be the same. In comparing the DRC module 402 and the DRC module 502, many of the components may be the same. For example, the nonlinear domain converters 512 may be the same as the nonlinear domain converters 412, the frame level detector 514 may be the same as the frame level detector 414, the nonlinear mapper 516 may be the same as the nonlinear mapper 416, the linear domain converter 518 may be the same as the nonlinear domain converter 418, the second nonlinear domain converter 532 may be the same as the second nonlinear domain converter 432, the second frame level detector 534 may be the same as the second frame level detector 434, the second nonlinear mapper 536 may be the same as the second nonlinear mapper 436, and the linear domain converter 538 may be the same as the second linear domain converter 438.

The difference between the DRC module 502 and the DRC module 402 is that the DRC module 502 includes a combiner 540 to combine the outputs of the linear domain converter 518 and the second linear domain converter 538, with the output of the combiner 540 being provided to the single amplifier 508 or to the single gain smoother 520 before being provided to the single amplifier 508. The combiner 540 is configured to combine an output frame with a new frame level in the linear domain (from the second linear domain converter 538) and an input frame with a new frame level in the linear domain (from the linear domain converter 518) to generate a combined frame in the linear domain that is provided to the gain smoother 520 or the amplifier 508. For example, the combiner 540 may combine compressed gains in the linear domain from a corresponding input frame and output frame to generate a combined gain that is provided to the gain smoother 520 or the amplifier 508. Combining the gains may also be referred to as gain merging.

In some other implementations of a dual chain DRC module that includes a combiner, the combiner may be configured to combine an output frame with a new frame level in the logarithm domain (from the second nonlinear mapper 536) and an input frame with a new frame level in the logarithm domain (from the nonlinear mapper 516) to generate a combined frame in the logarithm domain. In this manner, the output of the combiner may be provided to a single linear domain converter to convert the combined frame back to the linear domain. For example, the combiner may combine compressed gains in the logarithm domain from a corresponding input frame and output frame to generate a combined gain that is provided to a linear domain converter to convert back to the linear domain before being provided to the gain smoother of the amplifier of the DRC module.

In both example implementations, the operating rate of the first chain and the second chain of the dual chain DRC module is the same such that the frame size is the same for both chains. In some implementations, the combiner operates at the same lower rate as the other components of the chains of the dual chain DRC module (e.g., at 6 kHz as compared to 192 kHz for the ANC module).

Any suitable operation may be performed by the combiner 540 to combine compressed gains. For example, the first chain of the DRC module 502 (such as the output of the linear domain converter 518) may generate the compressed gain $g_0[k]$ for input frame $x_0[k]$, and the second chain of the DRC module 502 (such as the output of the second linear domain converter 538) may generate the compressed gain $g_1[k]$ for the corresponding output frame $x_1[k]$. In some implementations, the combiner 540 is configured to combine the corresponding compressed gains $g_0[k]$ and $g_1[k]$ based on equation (12) below:

$$g_{total}[k]=g_0[k]*g_1[k] \quad (12)$$

The gain smoother 520 may perform gain smoothing based on equation (6) above (or in any other suitable manner), and the amplifier 508 may adjust the sample gains based on equation (7) above (or in any other suitable manner). Through the inclusion of a combiner 540, the DRC module 502 does not include another amplifier on the output of the ANC module 522 (e.g., the IIR filter 526). As such, the output of the ANC module 522 (e.g., the IIR filter 526) may be the cancellation signal 524.

Regarding IIR filters for ANC, an example IIR filter is a biquad filter. In some implementations, the FB IIR filter of an FB ANC module for an FB ANC system or hybrid ANC system may include one or more biquad filters. For example, an FB ANC module may include n number of biquad filters (for any suitable integer n) that are combined in sequence to generate output frames (including one or more output samples) of a cancellation signal. In some implementations, an ANC system including an FB ANC module with n number of biquad filters may include a multiple chain DRC module to perform DRC. For example, an n number of biquad filters may be associated with a multiple chain DRC module including n+1 number of chains. Each biquad filter's output may be coupled to a unique DRC module chain, and the input of the first biquad filter may be coupled to a unique DRC module chain. While in some implementations, each DRC module chain may include a separate gain smoother and amplifier (such as depicted in FIG. 4), in some other implementations, the outputs (compressed gains) of each DRC module chain may be combined using one or more combiners to generate a combined gain to be provided to a single gain smoother and amplifier before the first biquad filter.

Figure 6:
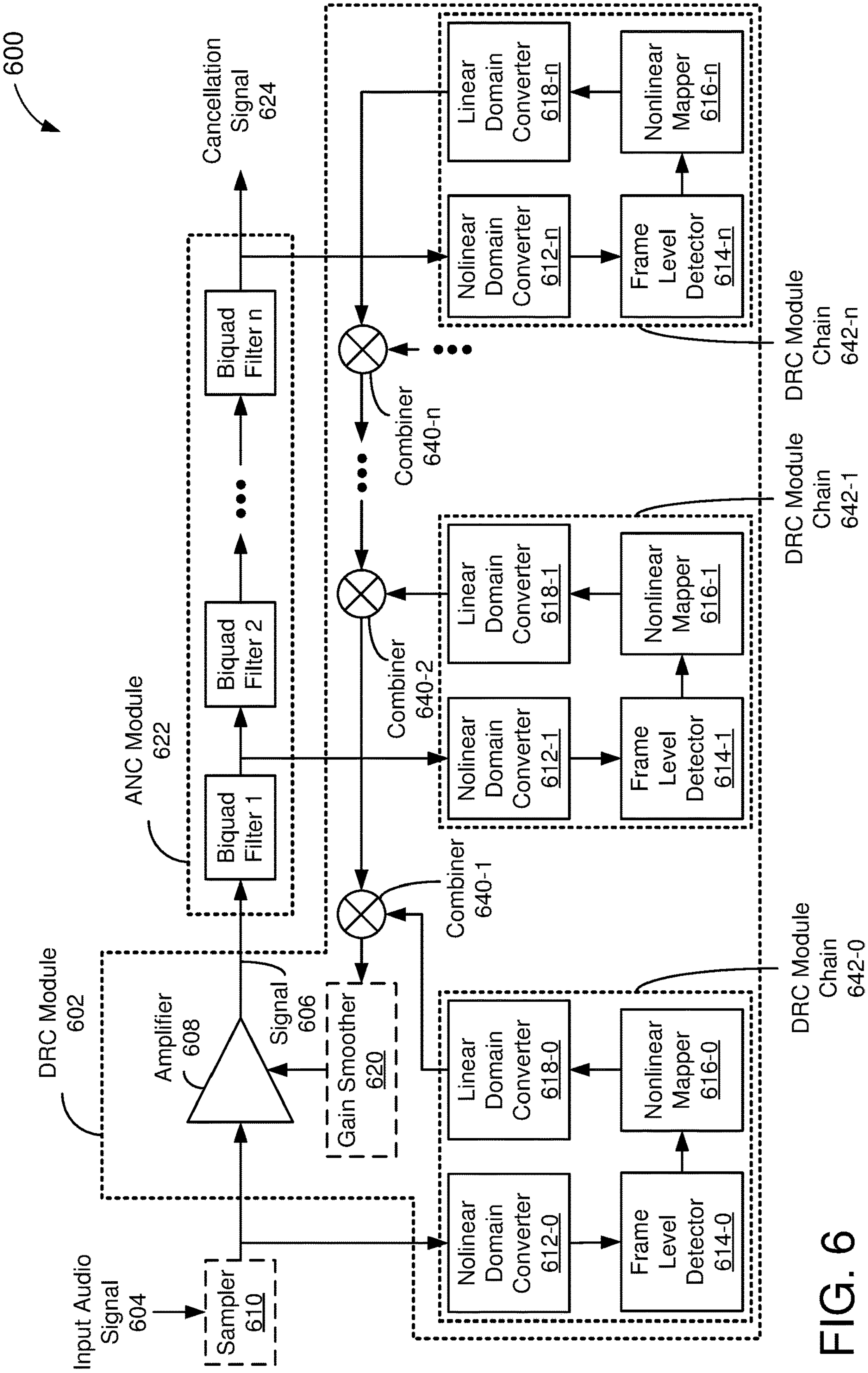
FIG. 6 shows a block diagram of another example ANC system with DRC for an ANC module including one or more biquad filters, according to some implementations.

FIG. 6 shows a block diagram of another example ANC system 600 with DRC for an ANC module 622 including one or more biquad filters, according to some implementations. The one or more biquad filters of the ANC module 622 are depicted as biquad filters 1 through n for any suitable integer n greater than or equal to one. The ANC system 600 also includes a DRC module 602. The ANC system 600 may be an FB ANC system (with a microphone positioned inside an earphone). In some implementations, the DRC module 602 and the ANC module 622 may be examples of the DRC module 212 and the ANC module 202, respectively, of FIG. 2. Thus, the DRC module 602 may be coupled to the ANC module 622 in order to provide a signal 606 that has a compressed dynamic range as compared to input audio signal 604.

In the depicted example ANC system 600, the DRC module 602 is an n+1 chain DRC module with the outputs of the n+1 chains combined before being provided to a single amplifier 608 or, optionally, a single gain smoother 620. In comparing the ANC system 500 of FIG. 5 and the ANC system 600 of FIG. 6, the input audio signals 404 and 504 may be the same, and the samplers 410 and 510 may be the same. In comparing the ANC module 522 to the ANC module 622, the IIR filter 526 may be n number of biquad filters configured in a sequential manner, with an output from each biquad filter being coupled to a corresponding DRC module chain to receive a copy of the generated outputs from the corresponding biquad filter. For example, the output of biquad filter 1 may be coupled to DRC module chain 642-1, and the output of biquad filter n may be coupled to the DRC module chain **642-*n*. The DRC module chain 642-0 may be coupled to the input before biquad filter 1**.

For the DRC module 602, the DRC module chain 642-0 may be the same as or similar to the first DRC module chain of the DRC module 502 of FIG. 5. For example, the DRC module chain 642-0 may include a nonlinear domain converter 612-0, a frame level detector 614-0, a nonlinear mapper 616-0, and a linear domain converter 618-0. The nonlinear domain converter 612-0 may be the same as the nonlinear domain converter 512, the frame level detector 614-0 may be the same as the frame level detector 514, the nonlinear mapper 616-0 may be the same as the nonlinear mapper 516, and the linear domain converter 618-0 may be the same as the linear domain converter 518.

Each of the other DRC module chains 642-1 through **642-*n* is associated with a different biquad filter of the n number of biquad filters. Each DRC module chain 642-*c* (for integer c from 1 to n) may include a biquad filter associated nonlinear domain converter 612-*c*, a biquad filter associated frame level detector 614-*c*, a biquad filter associated nonlinear mapper 616-*c*, and a biquad filter associated linear domain converter 618-*c*. Each biquad filter associated nonlinear domain converter 612-*c* is configured to convert a copy of each original biquad filter output frame from a stream of biquad filter output frames from the associated biquad filter c from the linear domain to the logarithm domain. In some implementations, each biquad filter associated nonlinear domain converter 612-*c* is the same as or similar to the second nonlinear domain converter 532 of FIG. 5. Each biquad filter associated frame level detector 614-*c* is configured to detect a frame level of each biquad filter output frame in the logarithm domain from the associated biquad filter c. In some implementations, each biquad filter associated frame level detector 614-*c* is the same as or similar to the second frame level detector 514 of FIG. 5. Each biquad filter associated nonlinear mapper 616-*c* is configured to map the frame level of each biquad filter output frame in the logarithm domain from the biquad filter associated frame level detector 614-*c* to a new frame level. In some implementations, each biquad filter associated nonlinear mapper 616-*c* is the same as or similar to the second nonlinear mapper 516 of FIG. 5. In some implementations, each of the DRC module chains 642-*c* for c from 1 to n includes a biquad filter associated linear domain converter 618-*c* to convert each biquad filter output frame with the new frame level from the logarithm domain to the linear domain. Each biquad filter associated linear domain converter 618-*c* may be the same or similar to the second linear domain converter 518 of FIG. 5. As such, the output from each DRC module chain 642-*c*** may be a compressed gain associated with an output frame from the corresponding biquad filter c.

The DRC module 602 also includes one or more combiners to combine the biquad filter output frame with the new frame level in the linear domain for each of the one or more biquad filters and the input frame with the new frame level in the linear domain to generate a combined frame in the linear domain. For example, the DRC module 602 includes n number of combiners (depicted as combiners 640-1 through **640-*n*). The compressed gains of a corresponding input frames and biquad filter output frames, as generated by the DRC module chains 642-0 through 642-*n*, are provided to the combiners 640-1 through 640-*n*, and the combiners 640-1 through 640-*n* are arranged to combine the corresponding compressed gains of the DRC module chains 642-0 through 642-*n*. For example, for a kth frame, combiner 640-*n* is configured to combine compressed gain $g_n[k]$ from DRC module chain 642-*n* and $g_{n-1}[k]$ from DRC module chain 642-(*n*−1) to generate a combined gain $g_{total,n}[k]$, combiner 640-(*n*−1) is configured to combine the combined gain $g_{total,n}[k]$ from combiner 640-*n* and $g_{n-2}[k]$ from DRC module chain 642-(*n*−2) to generate a combined gain $g_{total,n-1}[k]$, combiner 640-(*n*−2) is configured to combine the combined gain $g_{total,n-1}[k]$ from combiner 640-(*n*−1) and $g_{n-3}[k]$ from DRC module chain 642-(*n*−3) to generate a combined gain $g_{total,n-3}[k]$, and so on with combiner 640-1 being configured to combine the output combined gain from combiner 640-2 and $g_0[k]$ from DRC module chain 642-0 to generate a combined gain $g_{total}[k]$ that is provided to the gain smoother 620 or the amplifier 608. The gain smoother 620 may be the same as the gain smoother 520 of FIG. 5, and the amplifier 608 may be the same as the amplifier 508 of FIG. 5**.

While the combiners 640-1 through **640-*n* are depicted in FIG. 6 as combining compressed gains in the linear domain, in some other implementations, the combiners 640-1 through 640-*n* may be configured to combine compressed gains in the logarithm domain. For example, each of the DRC module chains 642-*c* for c from 1 to n may not include a biquad filter associated linear domain converter 618-*c*. As such, the combined gains generated by the combiners, including $g_{total}[k]$ generated by combiner 640-1, may be in the logarithm domain. In this manner, the DRC module 602 may include a linear domain converter configured to convert the compressed gain $g_{total}[k]$ from combiner 640-1 from the logarithm domain to the linear domain and provide the compressed gain $g_{total}[k]$ in the linear domain to the gain smoother 620 or the amplifier 608**.

Any suitable combination of compressed gains may be performed by each of the combiners 640-1 through **640-*n*. In some implementations, each of the combiners performs gain merging based on equation (12) above, in which the two inputs are multiplied together. In some implementations, each of the combiners performs the same operation of multiplying its two inputs together to generate an output of a combined compressed gain. However, the combiners may perform any suitable operation to combine compressed gains, which may be the same across the combiners or may differ between combiners. In addition, while the combiners are depicted as being coupled together in sequence, one or more combiners may be configured in any other suitable manner to combine the compressed gains from the DRC module chains 642-0 through 642-*n***. For example, a combiner may include more than two inputs such that less than an n number of combiners is needed. In another example, combiners may be organized in a tree structure such that multiple inputs to a combiner may come from outputs of other combiners.

Figure 7:
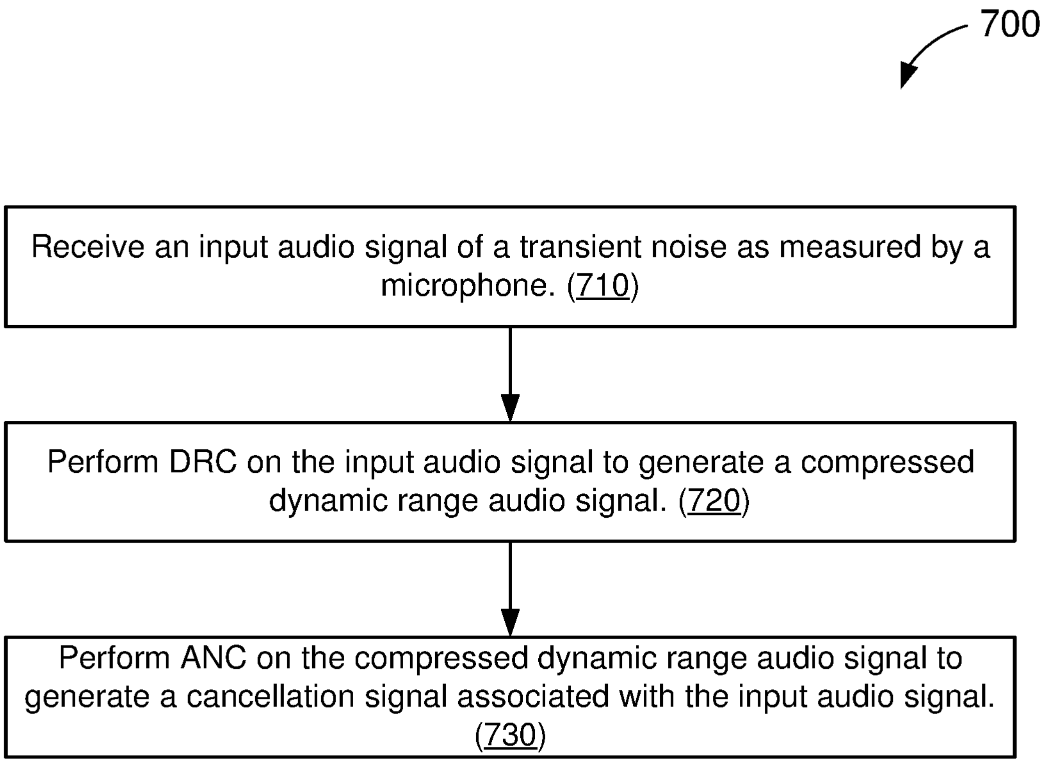
FIG. 7 shows an illustrative flowchart depicting an example operation for ANC including DRC, according to some implementations.

FIG. 7 shows an illustrative flowchart depicting an example operation 700 for ANC including DRC, according to some implementations. The example operation 700 may be performed by the ANC system 200 of FIG. 2. For any type of DRC module that may be including in an ANC system, the ANC system may perform the example operation 700 of FIG. 7 to perform ANC including DRC. For example, the example operation 700 may be performed by one or more of ANC system 300 of FIG. 3, ANC system 400 of FIG. 4, ANC system 500 of FIG. 5, or ANC system 600 of FIG. 6, with each of the ANC systems 300-600 including different types of DRC modules.

Referring to the example operation 700, the ANC system receives an input audio signal of a transient noise as measured by a microphone (710). The ANC system (such as a DRC module of the ANC system) performs DRC on the input audio signal to generate a compressed dynamic range audio signal (720). The ANC system (such as an ANC module of the ANC system) performs ANC on the compressed dynamic range audio signal to generate a cancellation signal associated with the input audio signal (730).

In some implementations, before performing DRC on the input audio signal in 720, a sampler samples the input audio signal to generate a stream of input frames. As noted above, each input frame may include one or more samples from the sampler. In this manner, performing DRC on the input audio signal includes performing DRC on the stream of input frames.

Different example implementations of performing DRC on the input audio signal in 720 (such as on the stream of input frames) are depicted in example operations 800-1100 of FIGS. 8-11, respectively. The example operations 800-1100 may be associated with different types of DRC modules of an ANC system to perform DRC. For example, operation 800 may be performed by a single chain DRC module (such as DRC module 302 of FIG. 3). Operations 800+900 may be performed by a dual chain DRC module having two amplifiers (such as DRC module 402 of FIG. 4). Operations 800+1000 may be performed by a dual chain DRC module that generates a combined output and has one amplifier (such as DRC module 502 of FIG. 5). Operations 800+1100 may be performed by a multiple chain DRC module associated with one or more biquad filters of an ANC system (such as DRC module 602 of FIG. 6). Each of FIGS. 8-11 are described below.

Figure 8:
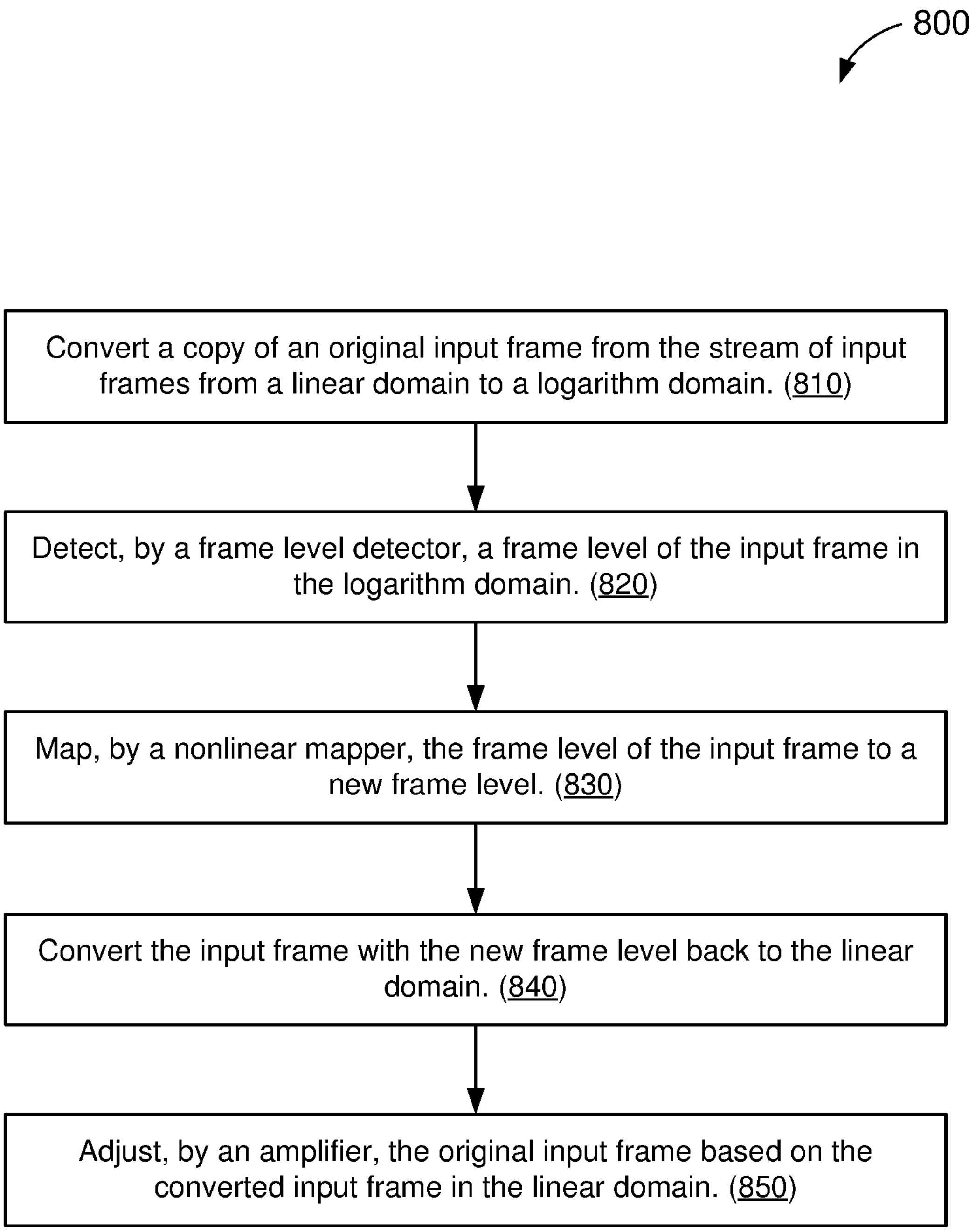
FIG. 8 shows an illustrative flowchart depicting an example operation for DRC, according to some implementations.

FIG. 8 shows an illustrative flowchart depicting an example operation 800 for DRC, according to some implementations. As noted above, operation 800 may be performed by the DRC module 302 or may be performed in combination with example operation 900, 1000, or 1100 by DRC module 402, 502, or 602, respectively. As such, operation 800 may be at least a portion of an example implementation of 720 of operation 700.

The example operation 800 may be performed for each input frame of a stream of input frames from a sampler. Referring to the example operation 800, a nonlinear domain converter of a DRC module converts a copy of an original input frame from the stream of input frames from a linear domain to a logarithm domain (810). For example, the nonlinear domain converter converts each sample generated by a sampler from the input audio signal, which is in the linear domain, into a logarithm domain. A frame level detector of the DRC module detects a frame level of the input frame in the logarithm domain (820). For example, the frame level detector may detect the largest magnitude gain across the samples of the input frame as the frame level of the input frame. A nonlinear mapper of the DRC module maps the frame level of the input frame to a new frame level (830). For example, the nonlinear mapper may use a nonlinear mapping function based on one or more parameters and the gain measurement to be compressed to compress (or leave the same) the gain measurement to generate a compressed gain. A linear domain converter of the DRC module converts the input frame with the new frame level back to the linear domain (840). For example, the linear domain converter may perform the inverse conversion performed in 810 by the nonlinear domain converter.

An amplifier of the DRC module adjusts the original input frame based on the converted input frame in the linear domain (850). For example, the amplifier may multiply an input gain by a compressed gain for each sample of a frame. As such, an IIR filter of an ANC module may be applied to the stream of adjusted input frames from the amplifier to generate a stream of output frames associated with the cancellation signal. For example, the adjusted samples may be provided to the IIR filter to generate a stream of output samples.

In some implementations, a gain smoother of the DRC module may perform gain smoothing on the input frame with the new frame level before being provided to the amplifier. As described above, the gain smoother may generate a compressed gain for each sample to be used as a control to the amplifier to adjust the gain of the sample. As such, the amplifier may multiply the compressed gain as generated by the gain smoother for a sample and the original gain of the sample as input to the amplifier to generate an adjusted sample.

If the DRC module is a single chain DRC module, the output of the IIR filter may be the cancellation signal to be used to reduce the transient noise during audio playback by a loudspeaker. If the DRC module is a multiple chain DRC module (such as a dual chain DRC module as depicted in one of FIG. 4 or 5 or an n+1 chain DRC module as depicted in FIG. 6), the DRC module may perform at least one of operation 900, 1000, or 1100 of FIG. 9, 10, or 11, respectively.

Figure 9:
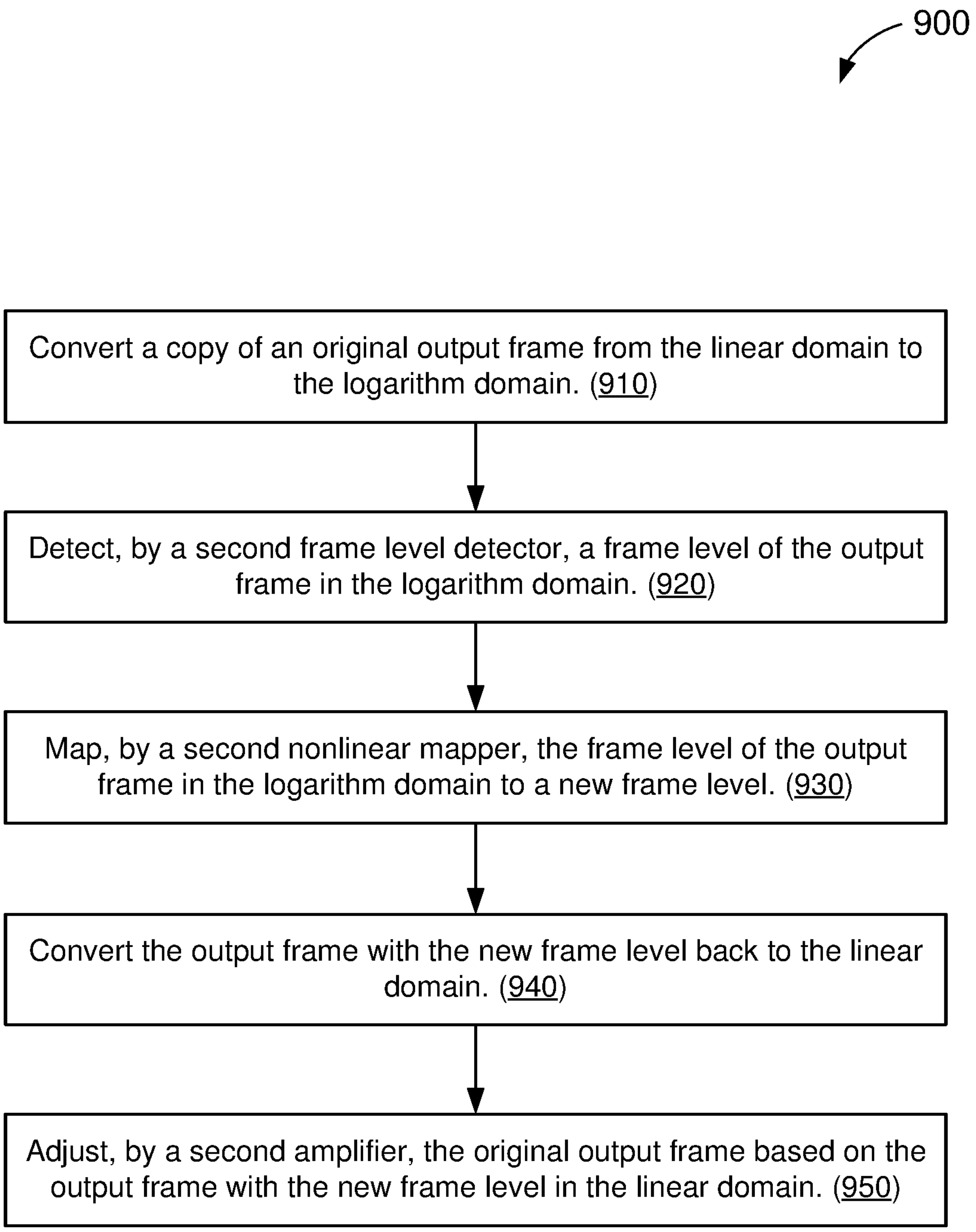
FIG. 9 shows an illustrative flowchart depicting another example operation for DRC, according to some implementations.

FIG. 9 shows an illustrative flowchart depicting another example operation 900 for DRC, according to some implementations. Operation 900 may be performed in combination with example operation 800 by DRC module 402 (which includes two amplifiers). As such, operations 800+900 may be at least a portion of an example implementation of 720 of operation 700.

The example operation 900 may be performed for each output frame of a stream of output frames from the ANC module (such as from an IIR filter of the ANC module). Referring to operation 900, a second nonlinear domain converter of the DRC module converts a copy of an original output frame from the stream of output frames from the linear domain to the logarithm domain (910). For example, the second nonlinear domain converter converts each sample of an output frame generated by the ANC module, which is in the linear domain, into a logarithm domain. A second frame level detector of the DRC module detects a frame level of the output frame in the logarithm domain (920). For example, the second frame level detector may detect the largest magnitude gain across the samples of the output frame as the frame level of the input frame. A second nonlinear mapper of the DRC module maps the frame level of the output frame to a new frame level (930). For example, the second nonlinear mapper may use a nonlinear mapping function based on one or more parameters and the gain measurement to be compressed to compress (or leave the same) the gain measurement to generate a compressed gain. A second linear domain converter of the DRC module converts the output frame with the new frame level back to the linear domain (940). For example, the second linear domain converter may perform the inverse conversion performed in 910 by the second nonlinear domain converter.

A second amplifier of the DRC module adjusts the original output frame from the ANC module based on the output frame with the new frame level in the linear domain (950). For example, the second amplifier may multiply a gain of an original output sample by a compressed gain output by the second linear domain converter for each sample of an output frame. As such, the cancellation signal may include a stream of adjusted output frames from the second amplifier.

In some implementations, a second gain smoother of the DRC module may perform gain smoothing on the output frame with the new frame level before being provided to the second amplifier. As described above, the second gain smoother may generate a compressed gain for each sample to be used as a control to the second amplifier to adjust the gain of the sample of the output frame. As such, the amplifier may multiply the compressed gain as generated by the second gain smoother for a sample and the original gain of the sample as output by the ANC module and input to the second amplifier to generate an adjusted sample of an adjusted output frame.

Figure 10:
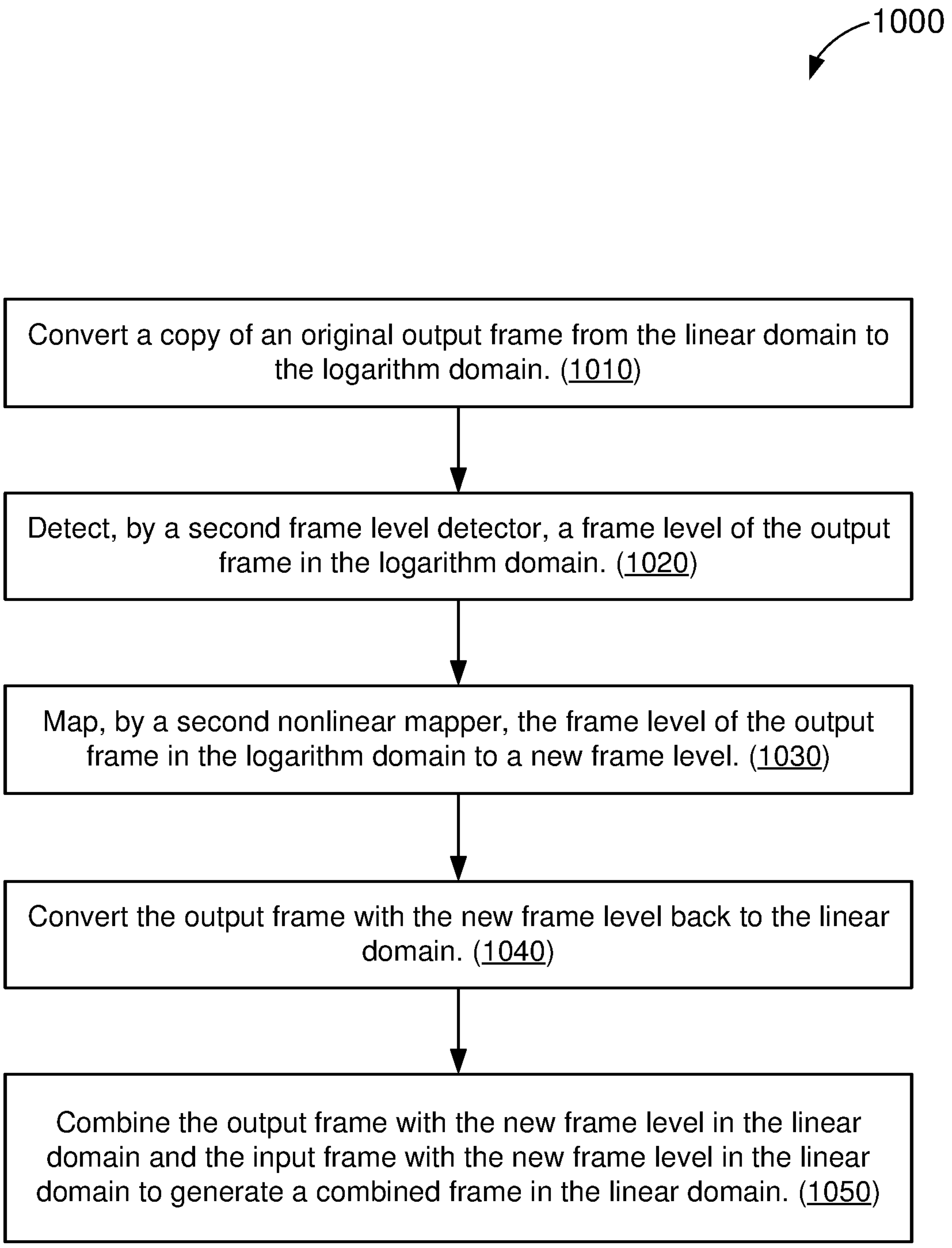
FIG. 10 shows an illustrative flowchart depicting another example operation for DRC, according to some implementations.

FIG. 10 shows an illustrative flowchart depicting another example operation 1000 for DRC, according to some implementations. Operation 1000 may be performed in combination with example operation 800 by DRC module 502 (which includes a combiner to generate one output for two DRC module chains and thus does not include a second amplifier). As such, operations 800+1000 may be at least a portion of an example implementation of 720 of operation 700.

The example operation 1000 may be performed for each output frame of a stream of output frames from the ANC module (such as from an IIR filter of the ANC module). Referring to operation 1000, a second nonlinear domain converter of the DRC module converts a copy of an original output frame from the stream of output frames from the linear domain to the logarithm domain (1010). A second frame level detector of the DRC module detects a frame level of the output frame in the logarithm domain (1020). A second nonlinear mapper of the DRC module maps the frame level of the output frame to a new frame level (1030). A second linear domain converter of the DRC module converts the output frame with the new frame level back to the linear domain (1040). Blocks 1010-1040 may be the same as blocks 910-940, respectively, of operation 900 of FIG. 9.

With the output frame with the new frame level back in the linear domain (such as a compressed gain being converted back to the linear domain), a combiner of the DRC module combines the output frame with the new frame level in the linear domain and the input frame with the new frame level in the linear domain to generate a combined frame in the linear domain (1050). For example, the combiner may perform gain merging between an output of the linear domain converter and an output of the second linear domain converter of the DRC module.

The amplifier of the DRC module that adjusts the original input frame in 850 is to adjust the original input frame based on the combined frame in the linear domain. In some implementations, the combined gains generated by the combiner are provided to a gain smoother to generate a combined gain for each of the samples of the input audio signal provided to the amplifier. The gain smoother provides the combined gain generated for each sample to the amplifier, and the amplifier adjusts the gain of the input sample based on the combined gain provided by the gain smoother. For example, the amplifier may multiply the original gain input to the amplifier by the combined gain provided by the gain smoother for each sample. In some other implementations, the combined gains generated by the combiner for a frame may be provided to the amplifier to adjust the gain of each sample of a frame input to the amplifier based on the combined gain from the combiner.

While the example operation 1000 is described above with reference to a combiner combining an output frame with the new frame level and an input frame with the new frame level in the linear domain, in some other implementations, the combiner may combine the output frame with the new frame level and the input frame with the new frame level in the logarithm domain. For example, a compressed gain of an input sample in the logarithm domain may be combined with a compressed gain of an output sample in the logarithm domain to generate a combined gain in the logarithm domain. In this manner, the DRC module may include one linear domain converter after the combiner to convert the combined gain in the logarithm domain back to the linear domain.

Figure 11:
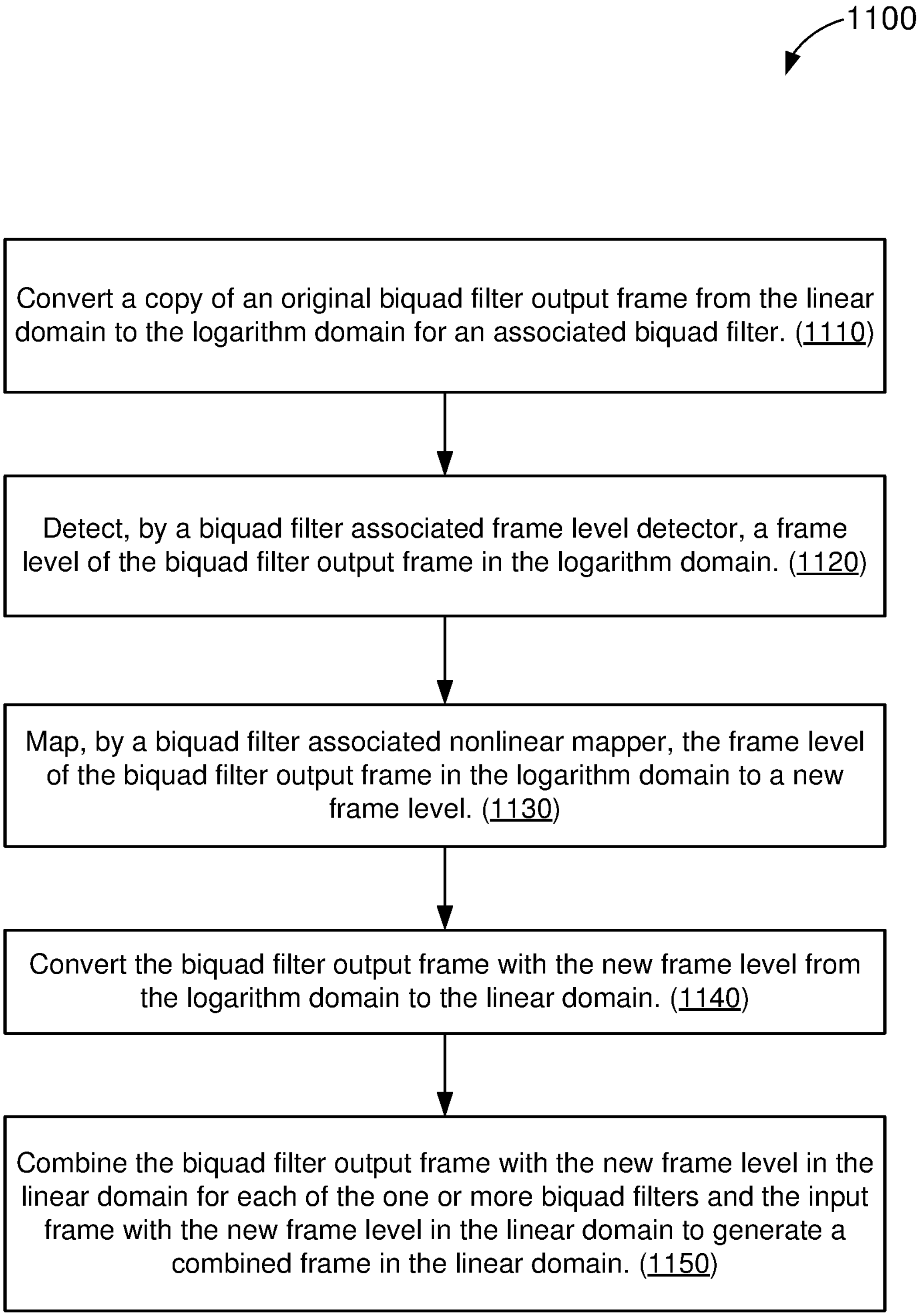
FIG. 11 shows an illustrative flowchart depicting another example operation for DRC, according to some implementations.

FIG. 11 shows an illustrative flowchart depicting another example operation 1100 for DRC, according to some implementations. Operation 1100 may be performed in combination with example operation 800 by DRC module 602 (which is associated with one or more biquad filters of the ANC module). As such, operations 800+1100 may be at least a portion of an example implementation of 720 of operation 700.

The one or more biquad filters of the ANC module may be applied to the stream of adjusted input frames from the amplifier before the ANC module. The one or more biquad filters may be coupled in sequence (such as depicted in the example implementation in FIG. 6). An output of a last biquad filter of the one or more biquad filters may include the stream of output frames that is output by the ANC module and is associated with the cancellation signal. The example operation 1100 may be performed for each frame output by each biquad filter of the one or more biquad filters.

Referring to operation 1100, a biquad filter associated nonlinear domain converter converts a copy of an original biquad filter output frame from the linear domain to the logarithm domain for an associated biquad filter (1110). For example, each nonlinear domain converter 612-*c* (for c from 1 to n) of the DRC module 602 may convert the gains of samples of a frame output by the corresponding biquad filter c from the linear domain to the logarithm domain. A biquad filter associated frame level detector detects a frame level of the biquad filter output frame in the logarithm domain (1120). For example, each frame level detector 614-*c* detects a largest magnitude from the gains of its received frame as the frame level. A biquad filter associated nonlinear mapper maps the frame level of the biquad filter output frame in the logarithm domain to a new frame level (1130). For example, each nonlinear mapper 616-*c* maps the gain measurement from the corresponding frame level detector to generate a compressed gain associated with the biquad filter. A biquad filter associated linear domain converter of the DRC module converts the biquad filter output frame with the new frame level from the logarithm domain to the linear domain (1140). For example, each linear domain converter 618-*c* converts the compressed gains generated in the logarithm domain by the corresponding nonlinear mapper 616-*c* back to the linear domain. As noted above, the operations of each of the biquad filter associated DRC module chains may be similar to the operation of the second chain of the DRC module 502 of FIG. 5. As such, blocks 1110-1140 may be similar to blocks 1010-1040, respectively, of operation 1000 of FIG. 10.

One or more combiners of the DRC module combine the biquad filter output frame with the new frame level in the linear domain for each of the one or more biquad filters and the input frame with the new frame level in the linear domain to generate a combined frame in the linear domain (1150). For example, the combiners 640-*c* of the DRC module 602 combine the outputs of the linear domain converters 618-0 through 618-*n* to generate a combined output that may be provided to the amplifier 608 or the gain smoother 620. For example, a first combiner may multiply a compressed gain from a last DRC module chain and a compressed gain from a next to last DRC module chain to generate a first combined gain, a second combiner may multiply the first combined gain and a compressed gain from a second to last DRC module chain to generate a second combined gain, and so on until all of the compressed gains associated with a specific input frame are combined to generate the final combined gain to be provided to a gain smoother or an amplifier of the DRC module.

The amplifier of the DRC module that adjusts the original input frame in 850 is to adjust the original input frame based on the combined frame from the one or more combiners. In some implementations, the final combined gains generated by the one or more combiners are provided to a gain smoother to generate a final combined gain for each of the samples of the input audio signal provided to the amplifier. The gain smoother provides the final combined gain generated for each sample to the amplifier, and the amplifier adjusts the gain of the input sample based on the final combined gain provided by the gain smoother. For example, the amplifier may multiply the original gain input to the amplifier by the final combined gain provided by the gain smoother for each sample. In some other implementations, the final combined gains generated by the one or more combiners for a frame may be provided to the amplifier to adjust the gain of each sample of a frame input to the amplifier based on the final combined gain from the one or more combiners.

While the example operation 1100 is described above with reference to the one or more combiners combining one or more biquad filter associated output frames with a new frame level and an input frame with a new frame level in the linear domain, in some other implementations, the one or more combiners may combine the frame with the new frame levels in the logarithm domain. For example, a compressed gain of a biquad filter n associated sample in the logarithm domain may be combined with a compressed gain of a biquad filter n−1 associated sample in the logarithm domain to generate a first combined gain in the logarithm domain, the first combined gain in the logarithm domain may be combined with a compressed gain of a biquad filter n−2 associated sample in the logarithm domain to generate a second combined gain in the logarithm domain, and so on to generate a final combined gain in a logarithm domain. In this manner, the DRC module may include one linear domain converter after the final combiner of the one or more combiners to convert the final combined gain in the logarithm domain back to the linear domain.

As described above, various implementations of incorporating DRC may be incorporated into an ANC system to improve ANC for transient noises. One or more of the example implementations described above may be implemented in an ANC device (such as ANC headphones) to reduce transient noises during audio playback.

Figure 12:
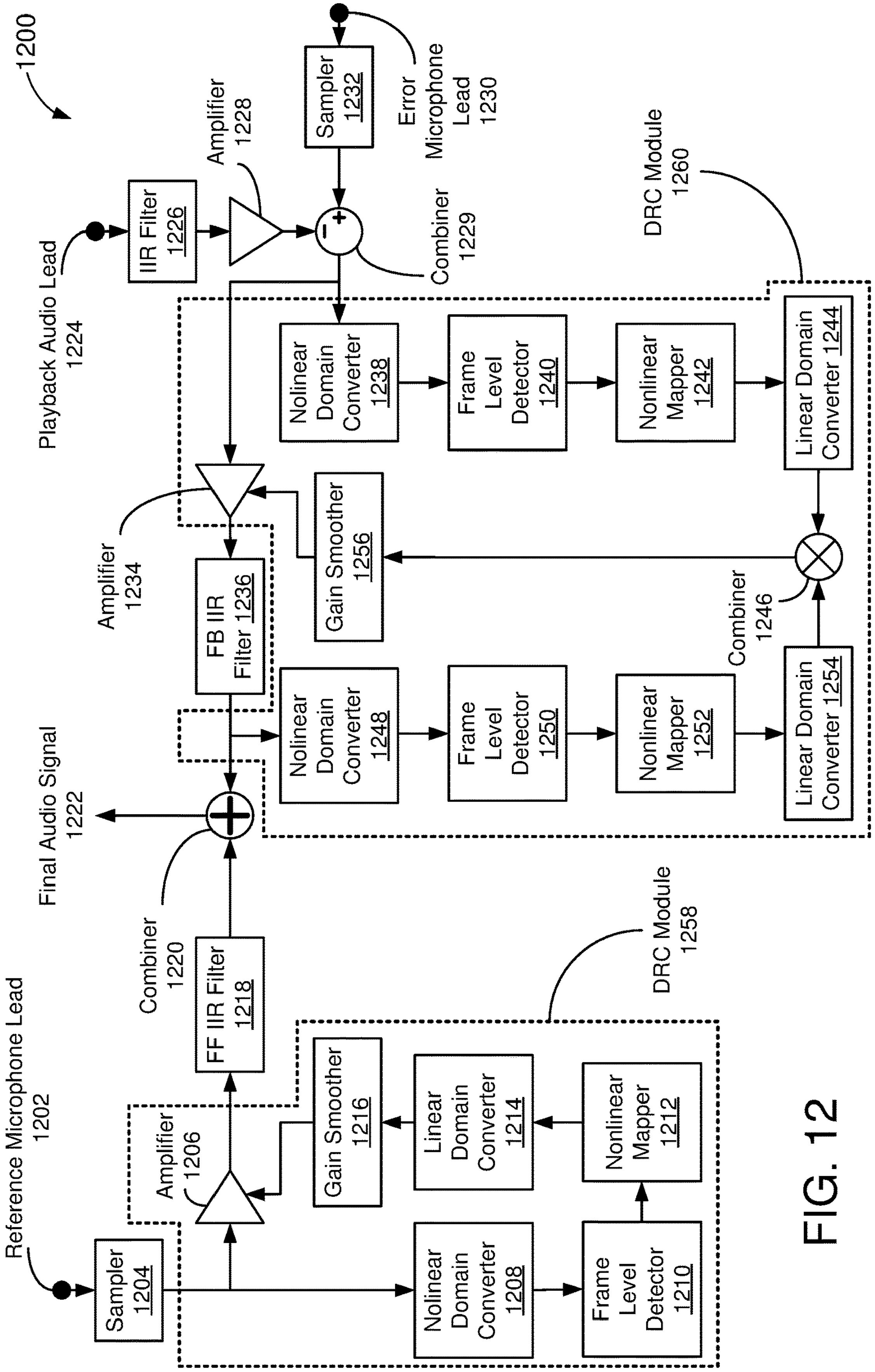
FIG. 12 shows a block diagram of an example ANC system with DRC, according to some implementations.

FIG. 12 shows a block diagram of an example ANC system 1200 with DRC, according to some implementations. The example ANC system 1200 may be a specific implementation of the ANC system 200 of FIG. 2 and incorporate one or more aspects of one or more of the example implementations described above. As depicted, the ANC system 1200 may be a hybrid ANC system. For example, the ANC system 1200 includes a DRC module 1258 coupled to an FF IIR filter 1218 for an FF ANC portion of the hybrid ANC system, and the ANC system 1200 may include a DRC module 1260 and an FB IIR filter 1236 for an FB ANC portion of the hybrid ANC system. The hybrid ANC system may be coupled to a reference microphone positioned on the outside of an earphone and an error microphone positioned inside the earphone. Components 1206-1218 may be associated with the FF ANC portion of the ANC system 1200. For the FF ANC portion of the ANC system 1200, the DRC module 1258 may be configured to perform DRC on a reference audio signal of a transient noise received from a reference microphone lead 1202 coupled to the reference microphone measuring the transient noise. Components 1234-1256 may be associated with the FB ANC portion of the ANC system 1200. For the FB ANC portion of the ANC system 1200, the DRC module 1260 may be configured to perform DRC an audio signal associated with a feedback from audio playback by a loudspeaker as received from an error microphone lead 1230 coupled to the error microphone measuring the feedback. To note, the error microphone may measure environmental noise, including a transient noise, in addition to potential feedback based on audio played by the loudspeaker.

Referring to the FF ANC portion of the ANC system 1200, the ANC system 1200 may receive the input reference audio signal from the reference microphone at the reference microphone lead 1202. As noted above, the reference microphone may be positioned outside an earphone to measure environmental noise, and the input reference audio signal may be associated with a transient noise as measured by the reference microphone. The FF ANC portion of the ANC system 1200 may be similar to the ANC system 300 including a single chain DRC module 302. The sampler 1204 samples the input reference audio signal to generate a stream of input reference frames. In some implementations, the sampler 1204 is the same as the sampler 310 of the ANC system 300. As such, the sampler 1204 may generate a plurality of input reference samples, with each input reference frame including one or more input reference samples. As noted above, the frame size may be based on a difference in the processing frequency of the FF IIR filter 1218 and the processing frequency of the DRC module chain (e.g., 192 kHz compared to 6 kHz such that the frame size is 32 samples).

The DRC module 1258 is configured to perform DRC on the stream of input reference frames. As depicted in FIG. 12, the DRC module 1258 includes a reference nonlinear domain converter 1208, a reference frame level detector 1210, a reference nonlinear mapper 1212, a reference linear domain converter 1214, a reference gain smoother 1216, and a reference amplifier 1206. The DRC module 1258 may be similar to the DRC module 302. For example, the reference nonlinear domain converter 1208 may be the same as the nonlinear domain converter 312, the reference frame level detector 1210 may be the same as the frame level detector 314, the reference nonlinear mapper 1212 may be the same as the nonlinear mapper 316, the reference linear domain converter 1214 may be the same as the linear domain converter 318, the reference gain smoother 1216 may be the same as the gain smoother 320, and the reference amplifier 1206 may be the same as the amplifier 308. Example implementations and operations of the components 308-320 of the DRC module 302 are described above and, as such, may apply to the components 1206-1216 of the DRC module 1258.

For example, in performing DRC on the stream of input reference frames, for each original input reference frame from the stream of input reference frames, the reference nonlinear domain converter 1208 is configured to convert a copy of the original input reference frame from a linear domain to a logarithm domain. For example, the reference nonlinear domain converter 1208 may convert each sample's gain in a linear domain as received from the sampler 1204 to a logarithm domain. The reference frame level detector 1210 is configured to detect a frame level of the input reference frame in the logarithm domain. For example, the reference frame level detector 1210 may generate a frame level as a largest magnitude gain measurement across the samples of the input reference frame. The reference nonlinear mapper 1212 is configured to map the frame level of the input reference frame to a new frame level. For example, the reference nonlinear mapper 1212 may compress the gain measurements from the reference frame level detector 1210 based on a nonlinear mapping function and compression factors (such as described above). The reference linear domain converter 1214 is configured to convert the input reference frame with the new frame level back to the linear domain. For example, the reference linear domain converter 1214 may perform an inverse function of the nonlinear domain converter 1208 to convert the compressed gain measurements in the logarithm domain from the reference nonlinear mapper 1212 back to the linear domain.

The reference gain smoother 1216 is configured to perform gain smoothing on the input reference frame with the new frame level in the linear domain. For example, the reference gain smoother 1216 may generate a compressed gain for each sample of the input reference frame, with the compressed gains for the samples being provided to the reference amplifier 1206. The reference amplifier 1206 is configured to adjust the original input reference frame (from the sampler 1204) based on the corresponding gain smoothed input reference frame (from the gain smoother 1216). Adjusting each original input reference frame from the stream of input reference frames generates a compressed dynamic range reference audio signal. The compressed dynamic range reference audio signal is the input reference audio signal with a compressed dynamic range. In this manner, the reference amplifier 1206 generates a compressed dynamic range reference audio signal including a plurality of adjusted input reference frames, with each adjusted input reference frame including one or more compressed samples.

The FF ANC portion of the ANC system 1200 performs ANC on the compressed dynamic range reference audio signal, which includes applying the FF IIR filter 1218 to each adjusted input reference frame to generate a stream of reference output frames of a cancellation signal. As described above with reference to the IIR filter 326 of the ANC module 322, the FF IIR filter 1218 may be of any size order and configured in any suitable manner to generate the cancellation signal (which includes a plurality of reference output samples organized into a plurality of reference output frames.

To generate the final audio signal 1222 to be played by a loudspeaker to reduce feedback and transient noises, the cancellation signal from the FF ANC portion of the hybrid ANC system 1200 is to be combined with a processed error audio signal. The FB ANC portion of the hybrid ANC system 1200 may be configured to process the input error audio signal to generate a processed error audio signal, and a combiner 1220 is configured to combine the cancellation signal and the processed error audio signal to generate the final audio signal 1222. In some implementations, the combiner 1220 is configured to add the cancellation signal and the processed error audio signal. For example, the cancellation signal and the processed error audio signal may have a same frame rate and frame size such that each sample of the cancellation signal corresponds to a sample of the processed error audio signal. As such, the combiner 1220 may combine corresponding samples from the two input signals to generate a stream of output samples of the final audio signal 1222.

Referring to the FB ANC portion of the ANC system 1200, the ANC system 1200 may receive the input error audio signal from the error microphone at the error microphone lead 1230, with the FB ANC portion of the ANC system 1200 to process the input error audio signal to generate the processed error audio signal to be combined with the cancellation signal to generate the final audio signal 1222. As noted above, the error microphone may be positioned inside the earphone to measure feedback from audio played by the loudspeaker, and the input error audio signal may be associated with a feedback as measured by the error microphone. In some implementations, the error microphone may also measure at least a portion of the transient noise that makes it into the earphone, and the input error audio signal may also be associated with the transient noise. The FB ANC portion of the ANC system 1200 that processes the input error audio signal may be similar to the ANC system 500 including a dual chain DRC module 502 with a combiner 540 to generate a single signal to be input to a single amplifier. While a dual chain DRC module 1260 with a combiner 1246 is depicted in the example implementation in FIG. 12, in some other implementations, the DRC module 1260 may be a dual chain DRC module with two amplifiers (such as depicted in FIG. 4). In some further implementations the DRC module 1260 may be a multiple chain DRC module associated with one or more biquad filters if the FB IIR filter 1236 includes the one or more biquad filters (such as depicted in FIG. 6).

The sampler 1232 samples the input error audio signal to generate a stream of input error frames. In some implementations, the sampler 1232 is the same as the sampler 310 of the ANC system 300. As such, the sampler 1232 may generate a plurality of input error samples, with each input error frame including one or more input error samples. As noted above, the frame size may be based on a difference in the processing frequency of the FB IIR filter 1236 and the processing frequency of the chains of the DRC module 1260 (e.g., 192 kHz compared to 6 kHz such that the frame size is 32 samples).

The input error audio signal is associated with a feedback for the audio played by a loudspeaker. For example, since the error microphone is collocated with a loudspeaker inside of an earphone, the colocation of the error microphone and the loudspeaker could cause a feedback loop of audio outside of ANC played by the loudspeaker (such as music) that may be measured by the error microphone and compensated for by the final audio signal 1222 from the ANC system 1200. To prevent the FB ANC portion of the ANC system from compensating only for such audio played by the loudspeaker that may cause feedback, the ANC system 1200 may process the input error audio signal before providing the signal to the DRC module 1260 to attempt to remove the portion of the input error audio signal associated with such feedback. For example, the ANC system 1200 may generate a signal to be processed that is a difference between the input error audio signal received at the error microphone lead 1230 and an audio signal of the audio that is being played by the loudspeaker.

The audio played by the loudspeaker may be music or audio signals not associated with ANC (i.e., any audio signals played by the loudspeaker that are other than the final audio signal 1222). The ANC system 1200 is configured to receive a playback audio signal played by the loudspeaker at the playback audio lead 1224. In some implementations, the playback audio lead 1224 may be coupled to an audio codec that generates the decoded audio stream (such as music or other audio) played by the loudspeaker. For example, for ANC wireless headphones, the ANC headphones may receive an encoded audio stream to be played over wireless medium (such as using BLUETOOTH®), an audio codec may decode the received audio stream, and the loudspeaker may play the decoded audio stream. That decoded audio stream may also be received by the ANC system 1200 at the playback audio lead 1224.

Since the input error audio signal and the playback audio signal are to be combined to generate the audio signal to be processed by the DRC module 1260 and the FB IIR filter 1236, the ANC system 1200 may be configured to ensure that the playback audio signal and the input error audio signal are in consistent formats and timing and have consistent ranges in gain. In some implementations, the ANC system 1200 is configured to apply an IIR filter 1226 to the playback audio signal and pass the playback audio signal through an amplifier 1228. The IIR filter 1226 may be any suitable order filter, which may be configured by the manufacturer. The IIR filter 1226 may be configured to compensate for any timing differences between the playback audio signal and the input error audio signal (such as based on the latency in playing the audio by the loudspeaker and measuring a feedback from the audio by the error microphone. The amplifier 1228 of the ANC system 1200 is configured to adjust a gain of the playback audio signal after the IIR filter 1226 is applied to generate an adjusted playback audio signal. In some implementations, the amplifier 1228 is configured to reduce a gain of the playback audio signal so that the gain of the input error audio signal for audio played by the loudspeaker as measured by the error microphone is approximately similar to the gain of the playback audio signal.

The combiner 1229 is configured to combine the adjusted playback audio signal (such as after the IIR filter 1226 and the amplifier 1228) and the input error audio signal. The adjusted playback audio signal may include a stream of frames including one or more samples, similar to the input error audio signal. Combining the adjusted playback audio signal and the input error audio signal may include, for each frame of the adjusted playback audio signal and corresponding frame of the input error audio signal, combining the frame of the adjusted playback audio signal and the corresponding frame of the input error audio signal to generate a stream of combined frames. For example, the adjusted playback audio signal includes a stream of samples, and the input error audio signal includes a stream of samples, with the timing of the two audio signals having been synchronized such that a sample from the input error audio stream corresponds to a sample from the adjusted playback audio stream. In some implementations, the combiner 1229 is configured to generate a difference between the corresponding samples across the stream of samples to generate the signal to be processed by the DRC module 1260 and the FB IIR filter 1236. For example, for each pair of corresponding samples between the adjusted playback audio signal and the input error audio signal, the combiner 1229 may subtract the adjusted playback audio signal sample from the input error audio signal sample. As noted above, the output of the combiner 1229 may be a stream of combined frames, with each combined frame including one or more gain differences associated with one or more pairs of corresponding samples. Similar to as described above with reference to the DRC module 1258, a frame size of a combined frame may be based on a processing frequency of the chains of the DRC module 1260 and a processing frequency of the FB IIR filter 1236 (e.g., 192 kHz compared to 6 kHz such that the frame size is 32 combined samples/gain differences). The gain differences provided to the DRC module 1260 are referred to in the examples herein as samples or combined samples.

The DRC module 1260 is configured to perform DRC on the stream of combined frames (which is generated by the combiner 1229) to generate a compressed dynamic range error audio signal. The FB ANC portion of the ANC system 1200 is configured to perform ANC on the compressed dynamic range error audio signal, which includes applying the FB IIR filter 1236 to the compressed dynamic range error audio signal to generate the processed error audio signal that is combined with (such as added to) the cancellation signal from the FF IIR filter 1218 to generate the final audio signal.

Referring to the DRC module 1260, the DRC module 1260 includes an error nonlinear domain converter 1238, an error frame level detector 1240, an error nonlinear mapper 1242, an error linear domain converter 1244, a second error nonlinear domain converter 1248, a second error frame level detector 1250, a second error nonlinear mapper 1252, a second error linear domain converter 1254, an error combiner 1246, an error gain smoother 1256, and an error amplifier 1234. As noted above, the DRC module 1260 may be similar to the dual chain DRC module 504 of FIG. 5. For example, the error nonlinear domain converter 1238 may be the same as the nonlinear domain converter 512, the error frame level detector 1240 may be the same as the frame level detector 514, the error nonlinear mapper 1242 may be the same as the nonlinear mapper 516, the error linear domain converter 1244 may be the same as the linear domain converter 518, the second error nonlinear domain converter 1248 may be the same as the second nonlinear domain converter 532, the second error frame level detector 1250 may be the same as the second frame level detector 534, the second error nonlinear mapper 1252 may be the same as the second nonlinear mapper 536, the second error linear domain converter 1254 may be the same as the second linear domain converter 538, the error combiner 1246 may be the same as the combiner 540, the error gain smoother 1256 may be the same as the gain smoother 520, and the error amplifier 1234 may be the same as the amplifier 508. Example implementations and operations of the components 508-520 and 532-540 of the DRC module 502 are described above and, as such, may apply to the components 1234 and 1238-1256 of the DRC module 1260.

For example, in performing DRC on the stream of combined frames, for each original combined frame of the stream of combined frames, the error nonlinear domain converter 1238 is configured to convert a copy of the original combined frame from a linear domain to a logarithm domain. For example, the error nonlinear domain converter 1238 may convert each sample's gain in a linear domain as received from the combiner 1229 to a logarithm domain. The error frame level detector 1240 is configured to detect a frame level of the combined frame in the logarithm domain. For example, the error frame level detector 1240 may generate a frame level as a largest magnitude gain measurement across the samples of the input combined frame. The error nonlinear mapper 1242 is configured to map the frame level of the combined frame to a new frame level. For example, the error nonlinear mapper 1242 may compress the gain measurements from the error frame level detector 1240 based on a nonlinear mapping function and compression factors (such as described above). To note, the mapping function of the error nonlinear mapper 1242 may be the same or differ from the mapping function of the reference nonlinear mapper 1212. The error linear domain converter 1244 is configured to convert the combined frame with the new frame level back to the linear domain. For example, the error linear domain converter 1244 may perform an inverse function of the nonlinear domain converter 1238 to convert the compressed gain measurements in the logarithm domain from the error nonlinear mapper 1242 back to the linear domain.

For the second chain of the DRC module 1260 to process the processed error audio frames output by the FB IIR filter 1236, the second error nonlinear domain converter 1248 is coupled to an output of the FB IIR filter 1236. For the processed error audio frame of the stream of processed error audio frames output by the FB IIR filter 1236 that corresponds to the combined frame processed by the first chain of the DRC module 1260, the second error nonlinear domain converter 1248 is configured to convert a copy of the corresponding processed error audio frame from the linear domain to the logarithm domain. For example, the second error nonlinear domain converter 1248 may convert each sample's gain from the processed error audio frame in a linear domain as received from the FB IIR filter 1236 to a logarithm domain. The second error frame level detector 1250 is configured to detect a frame level of the corresponding processed error audio frame in the logarithm domain. For example, the second error frame level detector 1250 may generate a frame level as a largest magnitude gain measurement across the samples of the corresponding processed error audio frame. The second error nonlinear mapper 1252 is configured to map the frame level of the corresponding processed error audio frame to a new frame level. For example, the second error nonlinear mapper 1252 may compress the gain measurements from the second error frame level detector 1250 based on a nonlinear mapping function and compression factors (such as described above). To note, the mapping function of the second error nonlinear mapper 1252 may be the same or differ from the mapping function of the error nonlinear mapper 1242, which may be the same or differ from the mapping function of the reference nonlinear mapper 1212. The second error linear domain converter 1254 is configured to convert the corresponding processed error audio frame with the new frame level back to the linear domain. For example, the second error linear domain converter 1254 may perform an inverse function of the second error nonlinear domain converter 1248 to convert the compressed gain measurements in the logarithm domain from the second error nonlinear mapper 1252 back to the linear domain.

The error combiner 1246 is configured to combine the combined frame with the new frame level in the linear domain and the corresponding processed error audio frame with the new frame level in the linear domain to generate a second combined frame. For example, the error combiner 1246 may multiply the compressed gain output by the error linear domain converter 1244 for the combined frame and the compressed gain output by the second error linear domain converter 1254 for the corresponding processed error audio frame to generate a total compressed gain associated with the combined frame.

While the error combiner 1246 is depicted as combining compressed gains in the linear domain, in some other implementations, the error combiner 1246 may be configured to combine compressed gains in the logarithm domain. For example, the inputs to the error combiner 1246 may include an output from the error nonlinear mapper 1242 and an output from the second error nonlinear mapper 1252. In this manner, the error combiner 1246 may generate a total compressed gain in the logarithm domain. The DRC module 1260 may include a linear domain converter after the error combiner 1246 to convert the total compressed gain in the logarithm domain back to the linear domain (such as in generated the second combined frame to be provided to the error gain smoother 1256 for gain smoothing).

The error gain smoother 1256 is configured to perform gain smoothing on the second combined frame. For example, the reference error smoother 1256 may generate a total compressed gain for each sample of the second combined frame, with the total compressed gains for the samples being provided to the error amplifier 1234. The error amplifier 1234 is configured to adjust the original combined frame (from the combiner 1229) based on the corresponding gain smoothed second combined frame (from the gain smoother 1256). Adjusting each original combined frame from the stream of combined frames generates a compressed dynamic range error audio signal, to which the FB IIR filter 1236 is applied to generate the processed error audio signal.

Figure 13:
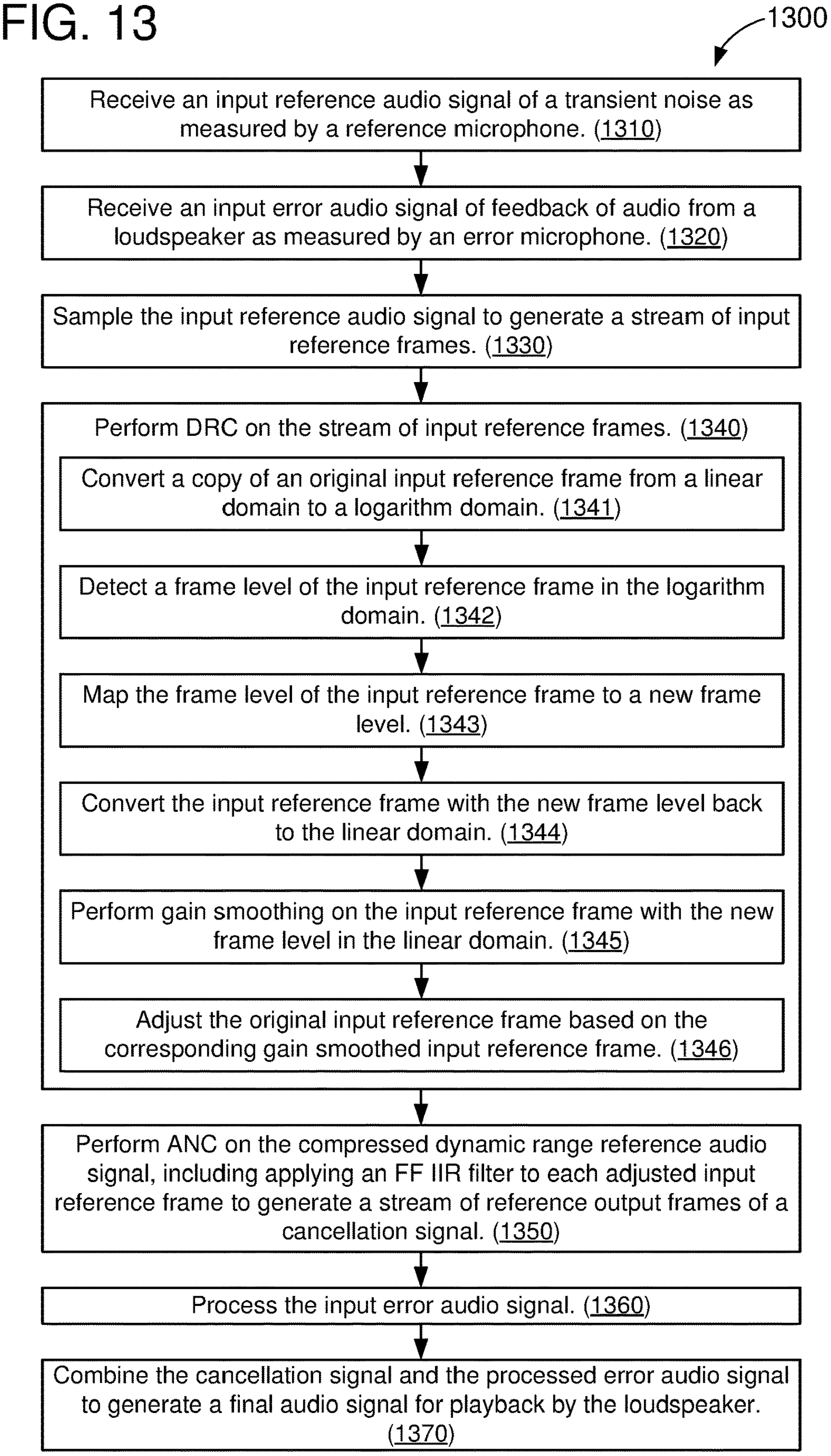
FIG. 13 shows an illustrative flowchart depicting an example operation for ANC including DRC, according to some implementations.
Figure 14:
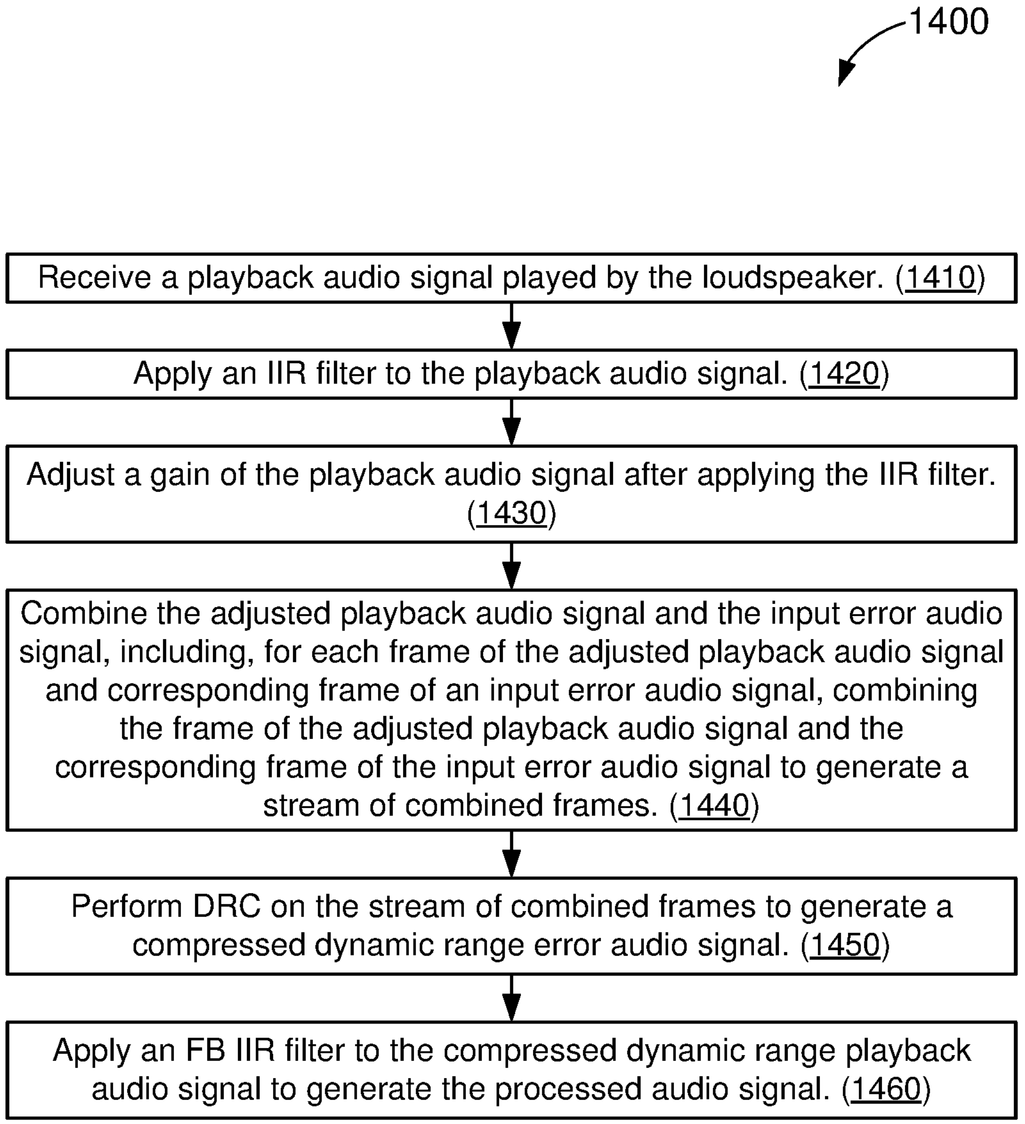
FIG. 14 shows an illustrative flowchart depicting an example operation for processing an input error audio signal, according to some implementations.
Figure 15:
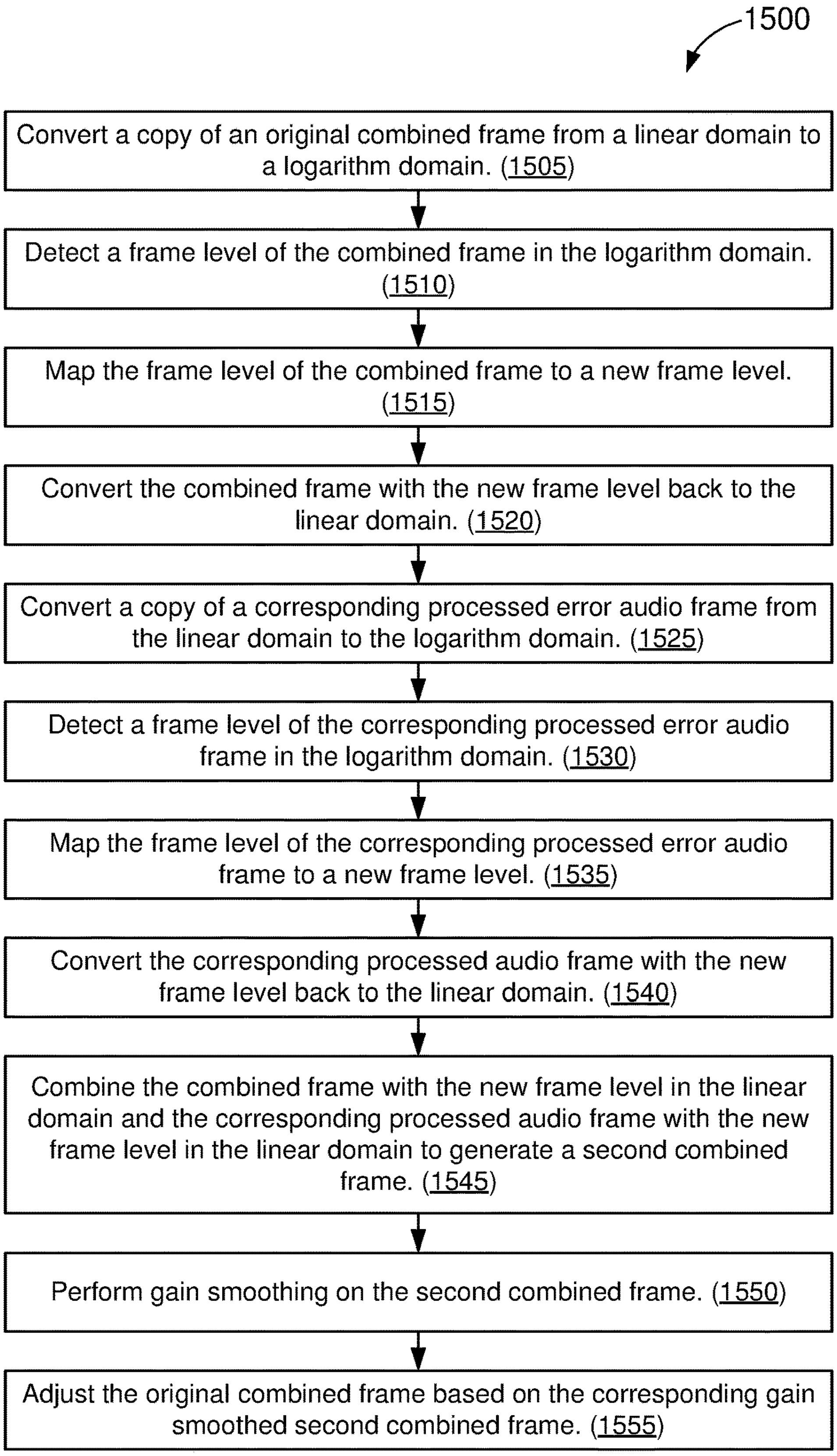
FIG. 15 shows an illustrative flowchart depicting an example operation for performing DRC for the processed error audio signal, according to some implementations.

FIGS. 13-15 depict example operations 1300-1500, respectively, that may be performed by a hybrid ANC system (such as the ANC system 1200 of FIG. 12). FIG. 13 is regarding operation of the FF ANC portion of a hybrid ANC system. FIG. 14 is regarding operation of the FB ANC portion of the hybrid ANC system. FIG. 15 is a specific implementation for performing DRC regarding operation of the FB ANC portion of the hybrid ANC system. The operations 1300-1500 are described below with reference to the ANC system 1200 of FIG. 12.

FIG. 13 shows an illustrative flowchart depicting an example operation 1300 for ANC including DRC, according to some implementations. As noted above, the operation 1300 focuses on the FF ANC portion of a hybrid ANC system. The operation 1300 may be performed by the ANC system 200 of FIG. 2, which may include the ANC system 1200 of FIG. 12. Operation 1300 is described with reference to the ANC system 1200, with specific example implementations for performing the various blocks of operation 1300 described above.

The ANC system 1200 receives (e.g., at the reference microphone lead 1202) an input reference audio signal of a transient noise as measured by a reference microphone (1310). The ANC system 1200 also receives (e.g., at the error microphone lead 1230) an input error audio signal of feedback of audio from a loudspeaker as measured by an error microphone (1320). The sampler 1204 samples the input reference audio signal to generate a stream of input reference frames (1330). The DRC module 1258 performs DRC on the stream of input reference frames (1340).

In performing DRC on the stream of input reference frames, blocks 1341-1346 may be performed for each original input reference frame from the stream of input reference frames. The reference nonlinear domain converter 1208 converting a copy of the original input reference frame from a linear domain to a logarithm domain (1341). The reference frame level detector 1210 detects a frame level of the input reference frame in the logarithm domain (1342). The reference nonlinear mapper 1212 maps the frame level of the input reference frame to a new frame level (1343). The reference linear domain converter 1214 converts the input reference frame with the new frame level back to the linear domain (1344). The reference gain smoother 1216 performs gain smoothing on the input reference frame with the new frame level in the linear domain (1345). The reference amplifier 1206 adjusts the original input reference frame based on the corresponding gain smoothed input reference frame (1346). As noted above, adjusting each original input reference frame from the stream of input reference frames generates a compressed dynamic range reference audio signal.

The FB ANC portion of the ANC system 1200 performs ANC on the compressed dynamic range reference audio signal, which includes applying the FF IIR filter 1218 to each adjusted input reference frame to generate a stream of reference output frames of a cancellation signal (1350). The ANC system 1200 (such as the FB ANC portion of the ANC system 1200) also processes the input error audio signal to generate a processed error audio signal (1360). The combiner 1220 combines the cancellation signal and the processed error audio signal to generate a final audio signal for playback by the loudspeaker (1370).

FIG. 14 shows an illustrative flowchart depicting an example operation 1400 for processing an input error audio signal, according to some implementations. As noted above, the operation 1400 focuses on the FB ANC portion of a hybrid ANC system. The operation 1400 may be performed in combination with the operation 1300 of FIG. 13. The operation 1400 may be performed by the ANC system 200 of FIG. 2, which may include the ANC system 1200 of FIG. 12. Operation 1400 is described with reference to the ANC system 1200, with specific example implementations for performing the various blocks of operation 1400 described above.

The ANC system 1200 receives (e.g., at the playback audio lead 1224) a playback audio signal played by the loudspeaker (1410). The ANC system 1200 applies the IIR filter 1226 to the playback audio signal (1420). The amplifier 1228 adjusts a gain of the playback audio signal after the IIR filter is applied (1430). The combiner 1229 combines the adjusted playback audio signal and the input error audio signal, including, for each frame of the adjusted playback audio signal and corresponding frame of the input error audio signal, combining the frame of the adjusted playback audio signal and the corresponding frame of the input error audio signal to generate a stream of combined frames (1440). The DRC module 1260 performs DRC on the stream of combined frames to generate a compressed dynamic range error audio signal (1450). The FB ANC portion of the ANC system 1200 applies the FB IIR filter 1236 to the compressed dynamic range error audio signal to generate the processed error audio signal (1460). As noted above, the processed error audio signal includes a stream of processed error audio frames. Referring back to block 1450 of operation 1400, an example implementation of performing DRC is depicted in FIG. 15 and described below.

FIG. 15 shows an illustrative flowchart depicting an example operation 1500 for performing DRC for the processed error audio signal, according to some implementations. As noted above, the operation 1500 focuses on the DRC module of the FB ANC portion of a hybrid ANC system performing DRC. The operation 1500 may be performed in combination with the operation 1300 of FIG. 13 and the operation 1400 of FIG. 14. The operation 1500 may be performed by the DRC module 212 of the ANC system 200 of FIG. 2, which may include the DRC module 1260 of the ANC system 1200 of FIG. 12. Operation 1500 is described with reference to the DRC module 1260 of the ANC system 1200, with specific example implementations for performing the various blocks of operation 1500 described above. The operation 1500 may be performed for each original combined frame of the stream of combined frames provided to the DRC module 1260.

The error nonlinear domain converter 1238 of the DRC module 1260 converts a copy of the original combined frame from the linear domain to the logarithm domain (1505). The error frame level detector 1240 detects a frame level of the combined frame in the logarithm domain (1510). The error nonlinear mapper 1242 maps the frame level of the combined frame to a new frame level (1515). The error linear domain converter 1244 converts the combined frame with the new frame level back to the linear domain (1520).

The second error nonlinear domain converter 1248 of the DRC module 1260 converts a copy of a corresponding processed error audio frame of the stream of processed error audio frames from the linear domain to the logarithm domain (1525). The second error frame level detector 1250 detects a frame level of the corresponding processed error audio frame in the logarithm domain (1530). The second error nonlinear mapper 1252 maps the frame level of the corresponding processed error audio frame to a new frame level (1535). The second error linear domain converter 1254 converts the corresponding processed error audio frame with the new frame level back to the linear domain (1540).

The error combiner 1246 of the DRC module 1260 combines the combined frame with the new frame level in the linear domain and the corresponding processed error audio frame with the new frame level in the linear domain to generate a second combined frame (1545). The error gain smoother 1256 performs gain smoothing on the second combined frame (1550). The error amplifier 1234 adjusts the original combined frame based on the corresponding gain smoothed second combined frame (1555). As noted above, adjusting each original combined frame from the stream of combined frames generates the compressed dynamic range error audio signal to which the FB IIR filter 1236 is applied.

As described above, various implementations for including DRC for ANC are described. In implementing any of the various implementations described above, an ANC system may reduce distortions generated by performing ANC for transient noises (such as saturating the audio playback signal) or feedback caused by ANC on sounds from audio playback. Incorporation of any of the implementations to perform DRC for ANC in an ANC device (such as in ANC headphones) thus improves a user listening experience.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

The methods, sequences or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

In the foregoing specification, embodiments have been described with reference to specific examples thereof. It will, however, be evident that various modifications and changes may be made thereto without departing from the broader scope of the disclosure as set forth in the appended claims. The specification and drawings are, accordingly, to be regarded in an illustrative sense rather than a restrictive sense.

What is claimed is:

1. A method for performing active noise cancellation (ANC), comprising:
- receiving an input audio signal of a transient noise as measured by a microphone;
- performing dynamic range compression (DRC) on the input audio signal to generate a compressed dynamic range audio signal; and
- performing ANC on the compressed dynamic range audio signal to generate a cancellation signal associated with the input audio signal.

2. The method of claim 1, further comprising sampling the input audio signal to generate a stream of input frames, wherein performing DRC on the input audio signal includes performing DRC on the stream of input frames.

3. The method of claim 2, wherein performing DRC on the stream of input frames includes converting a copy of each original input frame from the stream of input frames from a linear domain to a logarithm domain.

4. The method of claim 3, wherein:
- performing DRC on the stream of input frames further includes, for each input frame in the logarithm domain:
  - detecting, by a frame level detector, a frame level of the input frame in the logarithm domain;
  - mapping, by a nonlinear mapper, the frame level of the input frame to a new frame level;
  - converting the input frame with the new frame level back to the linear domain; and
  - adjusting, by an amplifier, the original input frame based on the converted input frame in the linear domain; and
- performing ANC on the compressed dynamic range audio signal includes applying an infinite impulse response (IIR) filter to a stream of adjusted input frames from the amplifier to generate a stream of output frames associated with the cancellation signal.

5. The method of claim 4, further comprising performing DRC on the stream of output frames, wherein performing DRC on the stream of output frames includes, for each original output frame from the stream of output frames:
- converting a copy of the original output frame from the linear domain to the logarithm domain;
- detecting, by a second frame level detector, a frame level of the output frame in the logarithm domain; and
- mapping, by a second nonlinear mapper, the frame level of the output frame in the logarithm domain to a new frame level.

6. The method of claim 5, wherein performing DRC on the stream of output frames further includes, for each output frame with the new frame level:
- converting the output frame with the new frame level back to the linear domain; and
- adjusting the original output frame by a second amplifier based on the output frame with the new frame level in the linear domain.

7. The method of claim 5, wherein performing DRC on the stream of input frames further includes, for each output frame with the new frame level:
- converting the output frame with the new frame level back to the linear domain; and
- combining the output frame with the new frame level in the linear domain and the input frame with the new frame level in the linear domain to generate a combined frame in the linear domain, wherein adjusting the original input frame by the amplifier is based on the combined frame in the linear domain.

8. The method of claim 4, wherein:
- applying the IIR filter to the stream of adjusted input frames includes applying one or more biquad filters to the stream of adjusted input frames, wherein an output of a last biquad filter of the one or more biquad filters includes the stream of output frames associated with the cancellation signal; and
- performing DRC on the stream of input frames further includes:
  - for each original biquad filter output frame from a stream of biquad filter output frames from each of the one or more biquad filters:
    - converting a copy of the original biquad filter output frame from the linear domain to the logarithm domain;
    - detecting, by a biquad filter associated frame level detector, a frame level of the biquad filter output frame in the logarithm domain;
    - mapping, by a biquad filter associated nonlinear mapper, the frame level of the biquad filter output frame in the logarithm domain to a new frame level; and
    - converting the biquad filter output frame with the new frame level from the logarithm domain to the linear domain; and
  - combining the biquad filter output frame with the new frame level in the linear domain for each of the one or more biquad filters and the input frame with the new frame level in the linear domain to generate a combined frame in the linear domain, wherein adjusting the original input frame by the amplifier is based on the combined frame in the linear domain.

9. The method of claim 4, wherein performing the DRC on the stream of input frames further includes, for each input frame with the new frame level, performing gain smoothing on the input frame with the new frame level.

10. An active noise cancellation (ANC) system, comprising:
- an input to receive an input audio signal of a transient noise as measured by a microphone;
- a dynamic range compression (DRC) module to perform DRC on the input audio signal to generate a compressed dynamic range audio signal; and
- an ANC module to perform ANC on the compressed dynamic range audio signal to generate a cancellation signal associated with the input audio signal.

11. The system of claim 10, further comprising a sampler to sample the input audio signal to generate a stream of input frames, wherein performing DRC on the input audio signal includes performing DRC on the stream of input frames.

12. The ANC system of claim 11, wherein the DRC module includes a nonlinear domain converter to convert a copy of each original input frame from the stream of input frames from a linear domain to a logarithm domain in performing DRC on the stream of input frames.

13. The ANC system of claim 12, wherein:

the DRC module includes:

a frame level detector to detect a frame level of each input frame in the logarithm domain;

a nonlinear mapper to map the frame level of each input frame to a new frame level;

a linear domain converter to convert each input frame with the new frame level back to the linear domain; and an amplifier to adjust each original input frame based on the converted input frame in the linear domain; and the ANC module includes:

an infinite impulse response (IIR) filter to be applied to a stream of adjusted input frames from the amplifier to generate a stream of output frames associated with the cancellation signal.

14. The ANC system of claim 13, wherein the DRC module is further to perform DRC on the stream of output frames, wherein the DRC module further includes:

a second nonlinear domain converter to convert a copy of each original output frame from the stream of output frames from the linear domain to the logarithm domain;

a second frame level detector to detect a frame level of each output frame in the logarithm domain; and a second nonlinear mapper to map the frame level of each output frame in the logarithm domain to a new frame level.

15. The ANC system of claim 14, wherein the DRC module further includes:

a second linear domain converter to convert each output frame with the new frame level back to the linear domain; and a second amplifier to adjust each original output frame based on the output frame with the new frame level in the linear domain.

16. The ANC system of claim 14, wherein the DRC module further includes:

a second linear domain converter to convert each output frame with the new frame level back to the linear domain; and a combiner to combine, for each output frame with the new frame level in the linear domain, the output frame with the new frame level in the linear domain and the input frame with the new frame level in the linear domain to generate a combined frame in the linear domain, wherein the amplifier is to adjust the original input frame based on the combined frame in the linear domain.

17. The ANC system of claim 13, wherein:

the IIR filter includes one or more biquad filters to be applied to the stream of adjusted input frames, wherein an output of a last biquad filter of the one or more biquad filters includes the stream of output frames associated with the cancellation signal; and the ANC system includes:

for each biquad filter of the one or more biquad filters, a corresponding DRC module chain associated with the biquad filter, wherein the corresponding DRC module chain includes:

a biquad filter associated nonlinear domain converter to convert a copy of each original biquad filter output frame from a stream of biquad filter output frames from the associated biquad filter from the linear domain to the logarithm domain;

a biquad filter associated frame level detector to detect a frame level of each biquad filter output frame in the logarithm domain from the associated biquad filter;

a biquad filter associated nonlinear mapper to map the frame level of each biquad filter output frame in the logarithm domain from the biquad filter associated frame level detector to a new frame level; and a biquad filter associated linear domain converter to convert each biquad filter output frame with the new frame level from the logarithm domain to the linear domain; and one or more combiners to combine the biquad filter output frame with the new frame level in the linear domain for each of the one or more biquad filters and the input frame with the new frame level in the linear domain to generate a combined frame in the linear domain, wherein the amplifier is to adjust the original input frame based on the combined frame in the linear domain.

18. The ANC system of claim 13, wherein the DRC module further includes a gain smoother to perform gain smoothing on each input frame with the new frame level.

19. A method for performing active noise cancellation (ANC), comprising:

receiving an input reference audio signal of a transient noise as measured by a reference microphone;

receiving an input error audio signal of feedback of audio from a loudspeaker as measured by an error microphone;

sampling the input reference audio signal to generate a stream of input reference frames;

performing dynamic range compression (DRC) on the stream of input reference frames, including, for each original input reference frame from the stream of input reference frames:

converting a copy of the original input reference frame from a linear domain to a logarithm domain;

detecting a frame level of the input reference frame in the logarithm domain;

mapping the frame level of the input reference frame to a new frame level;

converting the input reference frame with the new frame level back to the linear domain;

performing gain smoothing on the input reference frame with the new frame level in the linear domain; and adjusting the original input reference frame based on the corresponding gain smoothed input reference frame, wherein adjusting each original input reference frame from the stream of input reference frames generates a compressed dynamic range reference audio signal;

performing ANC on the compressed dynamic range reference audio signal, including applying a feed forward (FF) infinite impulse response (IIR) filter to each adjusted input reference frame to generate a stream of reference output frames of a cancellation signal;

processing the input error audio signal to generate a processed error audio signal; and combining the cancellation signal and the processed error audio signal to generate a final audio signal for playback by the loudspeaker.

20. The method of claim 19, wherein processing the error audio signal includes:

receiving a playback audio signal played by the loudspeaker;

applying an IIR filter to the playback audio signal;

adjusting a gain of the playback audio signal after applying the IIR filter to generate an adjusted playback audio signal;

combining the adjusted playback audio signal and the input error audio signal, including, for each frame of the adjusted playback audio signal and corresponding frame of the input error audio signal, combining the frame of the adjusted playback audio signal and the corresponding frame of the input error audio signal to generate a stream of combined frames;

performing DRC on the stream of combined frames to generate a compressed dynamic range error audio signal; and applying a feedback (FB) IIR filter to the compressed dynamic range error audio signal to generate the processed error audio signal, wherein:

the processed error audio signal includes a stream of processed error audio frames; and performing DRC on the stream of combined frames includes, for each original combined frame of the stream of combined frames:

converting a copy of the original combined frame from the linear domain to the logarithm domain;

detecting a frame level of the combined frame in the logarithm domain;

mapping the frame level of the combined frame to a new frame level;

converting the combined frame with the new frame level back to the linear domain;

converting a copy of a corresponding processed error audio frame of the stream of processed error audio frames from the linear domain to the logarithm domain;

detecting a frame level of the corresponding processed error audio frame in the logarithm domain;

mapping the frame level of the corresponding processed error audio frame to a new frame level;

converting the corresponding processed error audio frame with the new frame level back to the linear domain;

combining the combined frame with the new frame level in the linear domain and the corresponding processed error audio frame with the new frame level in the linear domain to generate a second combined frame;

performing gain smoothing on the second combined frame; and adjusting the original combined frame based on the corresponding gain smoothed second combined frame, wherein adjusting each original combined frame from the stream of combined frames generates the compressed dynamic range error audio signal.

* * * * *